(12) United States Patent
Venema

(10) Patent No.: US 11,046,718 B2
(45) Date of Patent: *Jun. 29, 2021

(54) MULTIFUNCTIONAL SUPERHYDROPHOBIC PARTICLES FOR CHEMICAL ADHESION AND BLOOMING

(71) Applicant: VELOX FLOW, LLC, Locust, NC (US)

(72) Inventor: Peter Craig Venema, Clayton, NC (US)

(73) Assignee: VELOX FLOW, LLC, Locust, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,640

(22) Filed: Apr. 27, 2020

(65) Prior Publication Data

US 2020/0255456 A1 Aug. 13, 2020

Related U.S. Application Data

(63) Continuation of application No. 15/533,207, filed as application No. PCT/US2015/064298 on Dec. 7, 2015, now Pat. No. 10,640,521.

(Continued)

(51) Int. Cl.
*C07F 7/08* (2006.01)
*C09C 1/30* (2006.01)
(Continued)

(52) U.S. Cl.
CPC ............ *C07F 7/0834* (2013.01); *B82Y 30/00* (2013.01); *C08G 18/4833* (2013.01);
(Continued)

(58) Field of Classification Search
None
See application file for complete search history.

(56) References Cited

U.S. PATENT DOCUMENTS

| 7,999,025 B2 | 8/2011 | Shumaker-Parry et al. |
| 2005/0223945 A1 | 10/2005 | Baumgart et al. |

(Continued)

FOREIGN PATENT DOCUMENTS

| CN | 101516974 A | 8/2009 |
| CN | 102608103 A | 7/2012 |

(Continued)

OTHER PUBLICATIONS

Office Action issued by the Chinese Patent Office for corresponding Chinese Patent Application No. 2015800757245, dated Mar. 26, 2020, 17 pages.

(Continued)

*Primary Examiner* — Clinton A Brooks
(74) *Attorney, Agent, or Firm* — Moore & Van Allen PLLC; Henry B. Ward, III

(57) ABSTRACT

Provided herein is a multifunctional particle and methods of forming the same. The multifunctional particle includes a surface of the particle; a first moiety coupled to the surface and having at least one substantially hydrophobic appendage; and a second moiety coupled to the surface and having at least one appendage comprising a reactive functional group and a substantially hydrophilic repeating unit, whereby the particle is substantially superhydrophobic as a result of the substantially hydrophobic appendage, chemically reactive as a result of the reactive functional group, and migratory to a surface of a substantially hydrophobic matrix in which the particle may be included as a result of the substantially hydrophilic repeating unit. Additionally, antimicrobial functional groups may be coupled to the surface.

13 Claims, 11 Drawing Sheets

Related U.S. Application Data

(60) Provisional application No. 62/088,165, filed on Dec. 5, 2014.

(51) Int. Cl.
*B82Y 30/00* (2011.01)
*C08G 18/48* (2006.01)
*C08G 59/14* (2006.01)
*C09D 183/08* (2006.01)

(52) U.S. Cl.
CPC ........ *C08G 59/1477* (2013.01); *C09C 1/3081* (2013.01); *C09D 183/08* (2013.01); *C01P 2004/03* (2013.01)

(56) References Cited

U.S. PATENT DOCUMENTS

| | | |
|---|---|---|
| 2005/0287353 A1 | 12/2005 | Trogolo |
| 2006/0286305 A1 | 12/2006 | Thies et al. |
| 2008/0070030 A1 | 3/2008 | Baran |
| 2009/0203838 A1 | 8/2009 | Koch et al. |
| 2009/0260297 A1 | 10/2009 | Anuj et al. |
| 2010/0119774 A1 | 5/2010 | Ogawa |
| 2010/0279118 A1 | 11/2010 | Hempenius |
| 2012/0125226 A1 | 5/2012 | Ohlhausen |
| 2012/0156135 A1 | 6/2012 | Farokhzad |
| 2014/0011766 A1 | 1/2014 | Krafft |
| 2014/0309343 A1 | 10/2014 | Venema |

FOREIGN PATENT DOCUMENTS

| | | |
|---|---|---|
| EP | 0228090 A2 | 7/1987 |
| WO | 2013071212 A1 | 5/2013 |
| WO | 2014071026 A1 | 5/2014 |

OTHER PUBLICATIONS

Second Office Action issued by the State Intellectual Property Office of China for corresponding Chinese Patent Application No. 20158007574.5 dated May 21, 2019.
Office Action issued by Canadian Intellectual Property Office for corresponding Canadian Patent Application No. 3,007,482 dated Aug. 30, 2019.
Extended European Search Report issued by the European Patent Office for corresponding European Patent Application No. 15866149.6 dated Nov. 19, 2018.
Database WPI Week 201279 Thomson Scientific, London, GB; AN 2012-M42025 XP002786365, & CN 102 608 103 A (Chinese Acad Sci Changchun Inst Appl Che) Jul. 25, 2012 (Jul. 25, 2012) abstract.
International Search Report for PCT Application No. PCT/US2015/064298 dated Feb. 12, 2016.
Written Opinion for PCT Application No. PCT/US2015/064298 dated Feb. 12, 2015.
International Preliminary Report for PCT Application No. PCT/US2015/064298 dated Jun. 6, 2017.

A: FIRST MOIETY WITH HYDROPHOBIC APPENDAGE
B: SECOND MOIETY WITH HYDROPHILIC, BLOOMING, APPENDAGE
C: OPTIONAL, THIRD MOIETY WITH HYDROPHOBIC, ANTI-MICROBIAL APPENDAGE
P: INORGANIC PARTICLE WITH REACTIVE HYDROXYL GROUPS

MULTIFUNCTIONAL SUPERHYDROPHOBIC PARTICLES FOR CHEMICAL ADHESION AND BLOOMING

CROSS-REFERENCE TO PRIORITY APPLICATION

This application is a continuation of U.S. patent application Ser. No. 15/533,207 filed on Jun. 5, 2017, for a "MULTIFUNCTIONAL SUPERHYDROPHOBIC PARTICLES FOR CHEMICAL ADHESION AND BLOOMING", which, in turn, is a national stage application (filed under 35 § U.S.C. 371) of PCT/US15/64298, filed Dec. 7, 2015, of the same title, which, in turn, claims priority to U.S. Patent Application No. 62/088,165 filed Dec. 5, 2014 of the same title; and all of which are hereby incorporated by reference in their entirety.

BACKGROUND

Particles such as diatomaceous earth nanoparticles (DE) may be functionalized with fluorocarbons or saturated hydrocarbons to become superhydrophobic, but these particles have been incapable of chemically bonding to anything due to the highly unreactive self-assembled monolayer (SAM) of the fluorocarbons or saturated hydrocarbons. Current coating technologies generally incorporate fluorinated diatomaceous earth (FDE) into polymer solutions. The particles are held in by mechanical forces and can easily be rubbed out of the surface, resulting in a surface that does not have a durable superhydrophobic characteristic. The polymer surface is typically highly porous and very rough. Further, generation of these polymer surfaces is inefficient because the particles are embedded in the polymer and not at the surface to provide superhydrophobic characteristics.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In one embodiment, a multifunctional particle is provided. In an embodiment, the multifunctional includes a surface of the particle; a first moiety coupled to the surface and having at least one substantially hydrophobic appendage; and a second moiety coupled to the surface and having at least one appendage comprising a reactive functional group and a substantially hydrophilic repeating unit, whereby the particle is superhydrophobic as a result of the substantially hydrophobic appendage, chemically reactive as a result of the reactive functional group, and migratory to a surface of a hydrophobic matrix in which the particle is included as a result of the substantially hydrophilic repeating unit.

In an aspect of any embodiment disclosed herein, the particle is a $SiO_2$-containing particle selected from the group consisting of diatomaceous earth, fumed silica, fused silica, and rice husk ash.

In some embodiments, the particle is selected from the group consisting of quartz, glass, aluminum, aluminum oxide, zirconium oxide, alumino-silicate, copper, tin, talc, an inorganic oxide, steel, iron asbestos, nickel, zinc, zinc oxide, and lead.

In a further aspect of the first embodiment, alone or in combination with any of the previous aspects of the first embodiment, the first moiety further comprises an anti-microbial functional group.

In a further aspect of the first embodiment, alone or in combination with any of the previous aspects of the first embodiment, the particle further comprises a third moiety coupled to the surface and having at least one appendage comprising an anti-microbial functional group.

In a further aspect of the first embodiment, alone or in combination with any of the previous aspects of the first embodiment, the first moiety is a reaction product of the particle with 3-trimethoxy silyl propyl dimethyl octadecyl ammonium chloride.

In a further aspect of the first embodiment, alone or in combination with any of the previous aspects of the first embodiment, the hydrophilic repeating unit comprises a functional group selected from the group consisting of oxyethylene and polyethylene glycol.

In a further aspect of the first embodiment, alone or in combination with any of the previous aspects of the first embodiment, the hydrophilic repeating unit is positioned between the reactive functional group and the particle.

In a further aspect of the first embodiment, alone or in combination with any of the previous aspects of the first embodiment, the second moiety is a reaction product of the particle with a member selected from the group consisting of amino-functional hydrocarbon silanes, N-(6-aminohexyl)-3-aminopropyltrimethoxysilane, aminohexylaminoethyltrimethoxysilane, aminopropyltrimethoxysilane, aminopropyltriethoxysilane, N-(2-Aminoethyl)-3-aminopropyltrimethoxysilane, methyacryloxypropyltrimethoxysilane, and combinations thereof.

In a further aspect of the first embodiment, alone or in combination with any of the previous aspects of the first embodiment, the second moiety comprises amine silanes, olefin silanes, anhydride silanes, epoxy silanes, halogen silanes, hydroxyl silanes, dipodal silanes, acrylate silanes, sulfur-containing silanes, water based silanes, isocyanate silanes, or azide silanes.

In a further aspect of the first embodiment, alone or in combination with any of the previous aspects of the first embodiment, the first moiety comprises a reaction product of the particle with a molecule of the structure:

$X_y(CH_3)_{(3-y)}SiLR$ where y is 1 to 3;

X is —Cl, —Br, —I, —H, HO—, R'HN—, R'$_2$N—, imidizolo, R'C(O)N(H)—, R'C(O)N(R")—, R'O—, $F_3$CC(O)N(H)—, $F_3$CC(O)N(CH$_3$)—, or $F_3$S(O)$_2$O—, where R' is a straight or branched chain hydrocarbon of 1 to 4 carbons and R" is methyl or ethyl;

L, a linking group, is —CH$_2$CH$_2$, —CH$_2$CH$_2$CH$_2$, —CH$_2$CH$_2$O, —CH$_2$CH$_2$CH$_2$O, —CH$_2$CH$_2$C(O), —CH$_2$CH$_2$CH$_2$C(O), —CH$_2$CH$_2$OCH$_2$, —CH$_2$CH$_2$CH$_2$OCH$_2$; and R is —(CF$_2$)nCF$_3$ or —(CF(CF$_3$)OCF$_2$)$_n$CF$_2$CF$_3$, where n is 0 to 24.

In a further aspect of the first embodiment, alone or in combination with any of the previous aspects of the first embodiment, the first moiety comprises a reaction product of the particle with 1H, 1H,2H,2H-perfluorooctyltrichlorosilane.

In a further aspect of the first embodiment, alone or in combination with any of the previous aspects of the first embodiment, the second moiety a reaction product of the particle with N-3-[(amino(polypropylenoxy)]aminopropyltrimethoxysilane.

In a second embodiment, a second particle is provided. In some embodiments, the particle includes a surface of the particle; a first moiety coupled to the surface and having at least one substantially hydrophobic appendage and an anti-microbial functional group; and a second moiety coupled to the surface and having at least one appendage comprising a reactive functional group, whereby the particle is substantially superhydrophobic as a result of the substantially hydrophobic appendage, chemically reactive as a result of the reactive functional group, and anti-microbial as a result of the anti-microbial functional group.

In an aspect of the second embodiment, the particle includes a third moiety coupled to the surface and having at least one appendage comprising a substantially hydrophilic repeating unit.

In an aspect of the second embodiment, alone or in combination with any of the previous aspects of the second embodiment, the first moiety is a reaction product of the particle with 3-trimethoxy silyl propyl dimethyl octadecyl ammonium chloride.

In an aspect of the second embodiment, alone or in combination with any of the previous aspects of the second embodiment, the second moiety comprises a substantially hydrophilic repeating unit positioned between the reactive functional group and the particle.

In an aspect of the second embodiment, alone or in combination with any of the previous aspects of the second embodiment, the hydrophilic repeating unit comprises a functional group selected from the group consisting of oxyethylene and polyethylene glycol.

In an aspect of the second embodiment, alone or in combination with any of the previous aspects of the second embodiment, the second moiety is a reaction product with the particle of a member selected from the group consisting of amino-functional hydrocarbon silanes, N-(6-aminohexyl)-3-aminopropyltrimethoxysilane, aminohexylaminoethyltrimethoxysilane, aminopropyltrimethoxysilane, aminopropyltriethoxysilane, N-(2-Aminoethyl)-3-aminopropyltrimethoxysilane, methyacryloxypropyltrimethoxysilane, and combinations thereof.

In an aspect of the second embodiment, alone or in combination with any of the previous aspects of the second embodiment, the second moiety comprises amine silanes, olefin silanes, anhydride silanes, epoxy silanes, halogen silanes, hydroxyl silanes, dipodal silanes, acrylate silanes, sulfur-containing silanes, water based silanes, isocyanate silanes, or azide silanes.

In a third embodiment, a third multifunctional particle is provided. In some embodiments, the third multifunctional particle includes a surface of the particle; a first moiety coupled to the surface and having at least one substantially hydrophobic appendage; a second moiety coupled to the surface and having at least one appendage comprising a reactive functional group; and a third moiety coupled to the surface and having at least one appendage comprising a substantially hydrophilic repeating unit; whereby the particle is substantially superhydrophobic as a result of the substantially hydrophobic appendage, chemically reactive as a result of the reactive functional group, and migratory to a surface of a hydrophobic matrix in which the particle is included as a result of the substantially hydrophilic repeating unit.

In an aspect of the third embodiment, the first moiety comprises an anti-microbial functional group. In an aspect of the third embodiment, alone or in combination with any of the previous aspects of the third embodiment, the first moiety is a reaction product of the particle with 3-trimethoxy silyl propyl dimethyl octadecyl ammonium chloride.

In an aspect of the third embodiment, alone or in combination with any of the previous aspects of the third embodiment, the substantially hydrophilic repeating unit comprises a functional group selected from the group consisting of oxyethylene and polyethylene glycol.

In an aspect of the third embodiment, alone or in combination with any of the previous aspects of the third embodiment, the second moiety is a reaction product of the particle with a member selected from the group consisting of amino-functional hydrocarbon silanes, N-(6-aminohexyl)-3-aminopropyltrimethoxysilane, aminohexylaminoethyltrimethoxysilane, aminopropyltrimethoxysilane, aminopropyltriethoxysilane, N-(2-Aminoethyl)-3-aminopropyltrimethoxysilane, methyacryloxypropyltrimethoxysilane, and combinations thereof.

In an aspect of the third embodiment, alone or in combination with any of the previous aspects of the third embodiment, the second moiety comprises amine silanes, olefin silanes, anhydride silanes, epoxy silanes, halogen silanes, hydroxyl silanes, dipodal silanes, acrylate silanes, sulfur-containing silanes, water based silanes, isocyanate silanes, or azide silanes.

In an aspect of the third embodiment, alone or in combination with any of the previous aspects of the third embodiment, the first moiety comprises a molecule of the structure:

$X_y(CH_3)_{(3-y)}SiLR$ where y is 1 to 3;

X is —Cl, —Br, —I, —H, HO—, R'HN—, R'$_2$N—, imidizolo, R'C(O)N(H)—, R'C(O)N(R")—, R'O—, F$_3$CC(O)N(H)—, F$_3$CC(O)N(CH$_3$)—, or F$_3$S(O)$_2$O—, where R' is a straight or branched chain hydrocarbon of 1 to 4 carbons and R" is methyl or ethyl;

L, a linking group, is —CH$_2$CH$_2$, —CH$_2$CH$_2$CH$_2$, —CH$_2$CH$_2$O, —CH$_2$CH$_2$CH$_2$O, —CH$_2$CH$_2$C(O), —CH$_2$CH$_2$CH$_2$C(O), —CH$_2$CH$_2$OCH$_2$, —CH$_2$CH$_2$CH$_2$OCH$_2$; and R is —(CF$_2$)nCF$_3$ or —(CF(CF$_3$)OCF$_2$)$_n$CF$_2$CF$_3$, where n is 0 to 24.

In an aspect of the third embodiment, alone or in combination with any of the previous aspects of the third embodiment, the first moiety is a reaction product of the particle with 1H, 1H,2H,2H-perfluorooctyltrichlorosilane.

In a fourth embodiment, a method for producing a particle is provided. In some embodiments, the method includes contacting a first moiety having at least one substantially hydrophobic appendage to a surface of a particle; and contacting a second moiety having at least one appendage comprising a reactive functional group and a substantially hydrophilic repeating unit to the surface, whereby the particle is substantially superhydrophobic as a result of the substantially hydrophobic appendage, chemically reactive as a result of the reactive functional group, and migratory to a surface of a hydrophobic matrix in which the particle may be included as a result of the substantially hydrophilic repeating unit.

In an aspect of the fourth embodiment, the method further includes rinsing the particle with a solvent to remove impurities.

In an aspect of the fourth embodiment, alone or in combination with any of the previous aspects of the fourth embodiment, the method includes rinsing the particle with a solvent to expose SiOH groups on the surface; and reacting the first moiety and the second moiety with the exposed SiOH groups.

In an aspect of the fourth embodiment, alone or in combination with any of the previous aspects of the fourth embodiment, the method includes providing a plurality of particles coupled to the first moiety and the second moiety; and generating a self-assembled monolayer from the plurality of particles.

In a fifth embodiment, a second method for producing a particle is provided. In some embodiments, the second method includes contacting a first moiety having at least one substantially hydrophobic appendage and an anti-microbial functional group with a particle having a surface; and contacting a second moiety having at least one appendage comprising a reactive functional group with the surface, whereby the particle is substantially superhydrophobic as a result of the hydrophobic appendage, chemically reactive as a result of the reactive functional group, and anti-microbial as a result of the anti-microbial functional group.

In an aspect of the fifth embodiment, the second method includes rinsing the particle with a solvent to remove impurities.

In an aspect of the fifth embodiment, alone or in combination with any of the previous aspects of the fifth embodiment, the second method includes rinsing the particle with a solvent to expose SiOH groups on the surface; wherein the first moiety and the second moiety react with SiOH groups.

In an aspect of the fifth embodiment, alone or in combination with any of the previous aspects of the fifth embodiment, the second method includes isolating a plurality of particles coupled to the first moieties and the second moieties; and generating a self-assembled monolayer from the plurality of particles.

In a sixth embodiment, a third method for producing a particle is provided. In some embodiments, the third method includes contacting a first moiety having at least one substantially hydrophobic appendage with a particle having a surface; contacting a second moiety having at least one appendage comprising a reactive functional group with the surface; and contacting a third moiety having at least one appendage comprising a substantially hydrophilic repeating unit with the surface; whereby the particle is substantially superhydrophobic as a result of the substantially hydrophobic appendage, chemically reactive as a result of the reactive functional group, and migratory to a surface of a hydrophobic matrix in which the particle is included as a result of the substantially hydrophilic repeating unit.

In an aspect of the sixth embodiment, the third method includes rinsing the particle with a solvent to remove impurities.

In an aspect of the sixth embodiment, alone or in combination with any of the previous aspects of the sixth embodiment, the third method includes rinsing the particle with a solvent to expose SiOH groups on the surface; and reacting the first moiety and the second moiety react with the exposed SiOH groups.

In an aspect of the sixth embodiment, alone or in combination with any of the previous aspects of the sixth embodiment, the third method includes isolating a plurality of particles coupled to first moieties and second moieties; and generating a self-assembled monolayer from the plurality of particles.

In a seventh embodiment, a composition is provided. In some embodiments, the composition includes a plurality of multifunctional particles comprising: at least one first moiety coupled to a surface of a particle and having at least one substantially hydrophobic appendage; and at least one second moiety coupled to the surface and having at least one appendage comprising a reactive functional group and a substantially hydrophilic repeating unit, whereby the multifunctional particle is substantially superhydrophobic as a result of the substantially hydrophobic appendage, chemically reactive as a result of the reactive functional group, and migratory to a surface of a substantially hydrophobic polymer in which the particle may be included as a result of the substantially hydrophilic repeating unit; and a substantially hydrophobic polymer associated with the plurality of multifunctional particles.

In an aspect of the seventh embodiment, the polymer is selected from thermosets, acrylates, methacrylates, polyesters, urethanes, epoxies, phenolics, thermoplastics, polydienes, polyvinyl chloride, polyphenylene sulfide, acrylics, maleic anhydride, vinyl acetate, diene-containing copolymers, halogen-modified homopolymers, chlorosulfonyl-modified homopolymers, polyamides, polyesters, polycarbonates, polysulfones, olefins, and combinations thereof.

In an aspect of the seventh embodiment, alone or in combination with any of the previous aspects of the seventh embodiment, the polymer is polymerized or the polymer comprises at least two precursor components copolymerized with the multifunctional particles.

In an aspect of the seventh embodiment, alone or in combination with any of the previous aspects of the seventh embodiment, at least a portion of the multifunctional particle is presented on an exterior of an article formed of the hydrophobic polymer and the plurality of multifunctional particles.

In an eighth embodiment, a second composition is provided. In some embodiments, the second composition includes a plurality of multifunctional particles, wherein each multifunctional particle comprises: at least one first moiety coupled to a surface of a particle and having at least one substantially hydrophobic appendage; at least one second moiety coupled to the surface and having at least one appendage comprising a reactive functional group; and at least one third moiety coupled to the surface and having at least one appendage comprising a substantially hydrophilic repeating unit; whereby the multifunctional particle is substantially superhydrophobic as a result of the substantially hydrophobic appendage, chemically reactive as a result of the reactive functional group, and migratory to a surface of a substantially hydrophobic polymer in which the particle may be included as a result of the substantially hydrophilic repeating unit; and a substantially hydrophobic polymer associated with the plurality of multifunctional particles.

In an aspect of the eighth embodiment, the polymer is selected from thermosets, acrylates, methacrylates, polyesters, urethanes, epoxies, phenolics, thermoplastics, polydienes, polyvinyl chloride, polyphenylene sulfide, acrylics, maleic anhydride, vinyl acetate, diene-containing copolymers, halogen-modified homopolymers, chlorosulfonyl-modified homopolymers, polyamides, polyesters, polycarbonates, polysulfones, olefins, and combinations thereof.

In an aspect of the eighth embodiment, alone or in combination with any of the previous aspects of the eighth embodiment, the polymer is polymerized or the polymer comprises at least two precursor components copolymerized with the multifunctional particles.

In an aspect of the eighth embodiment, alone or in combination with any of the previous aspects of the eighth embodiment, at least a portion of the multifunctional particle is presented on an exterior of an article formed of the hydrophobic polymer and the plurality of multifunctional particles.

Other aspects and features, as recited by the claims, will become apparent to those skilled in the art upon review of the following non-limited detailed description in conjunction with the accompanying figures.

BRIEF DESCRIPTION OF THE DRAWINGS

Figure 1A:
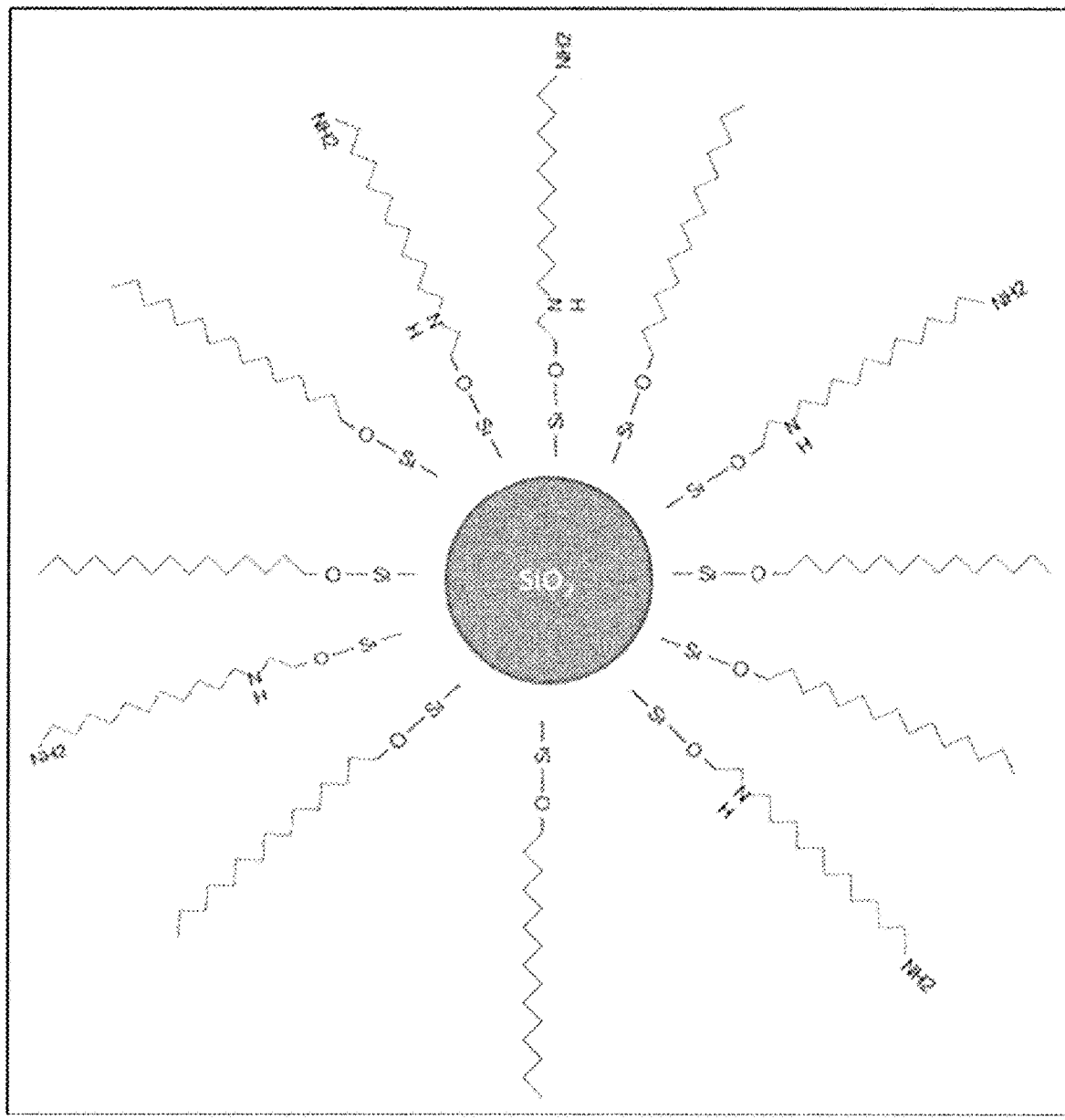
Figure 1B:
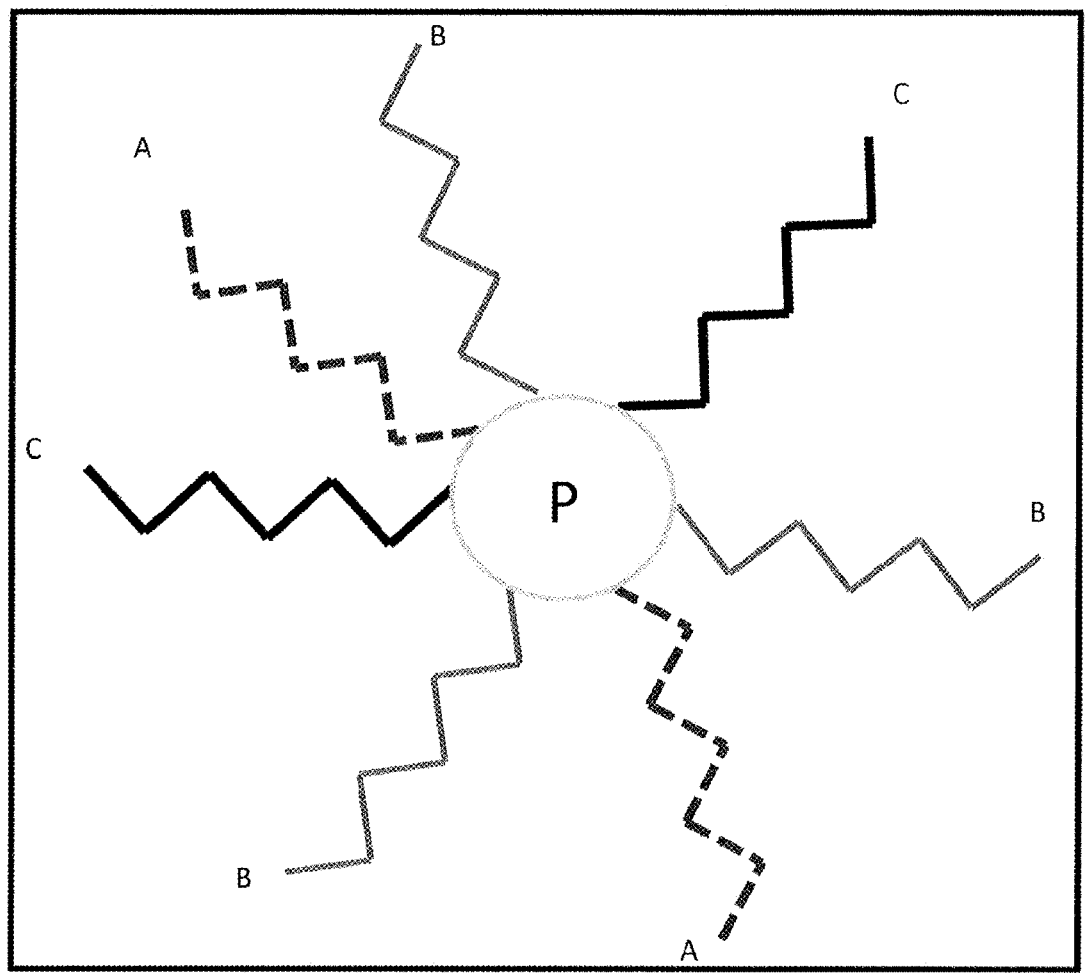
Figure 2:
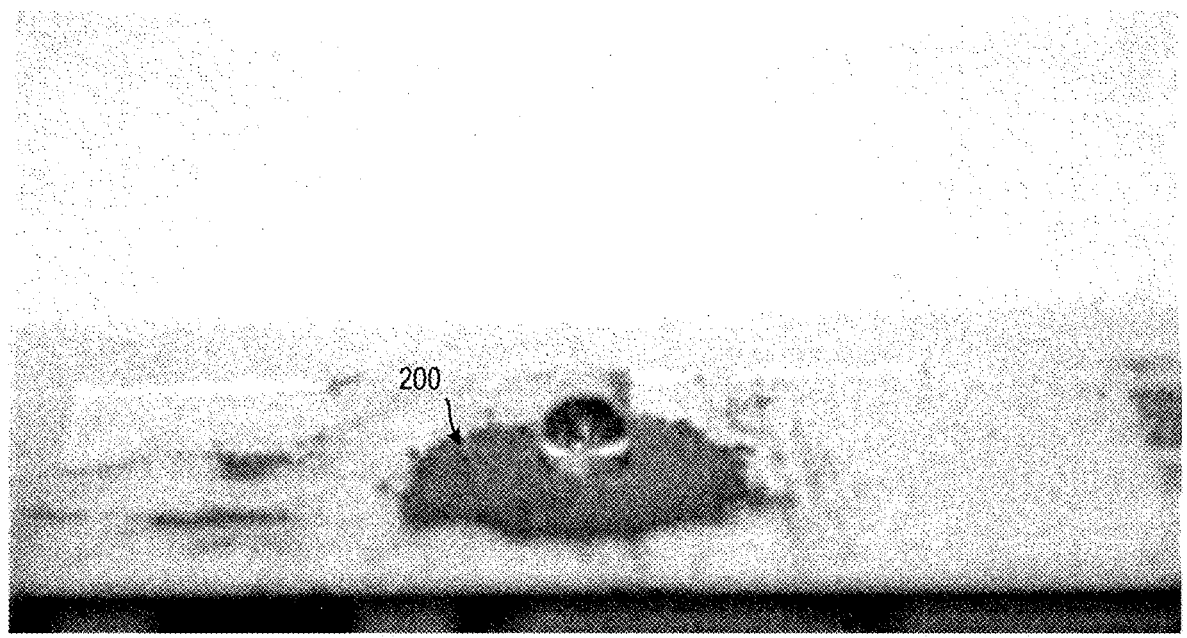
Figure 3:
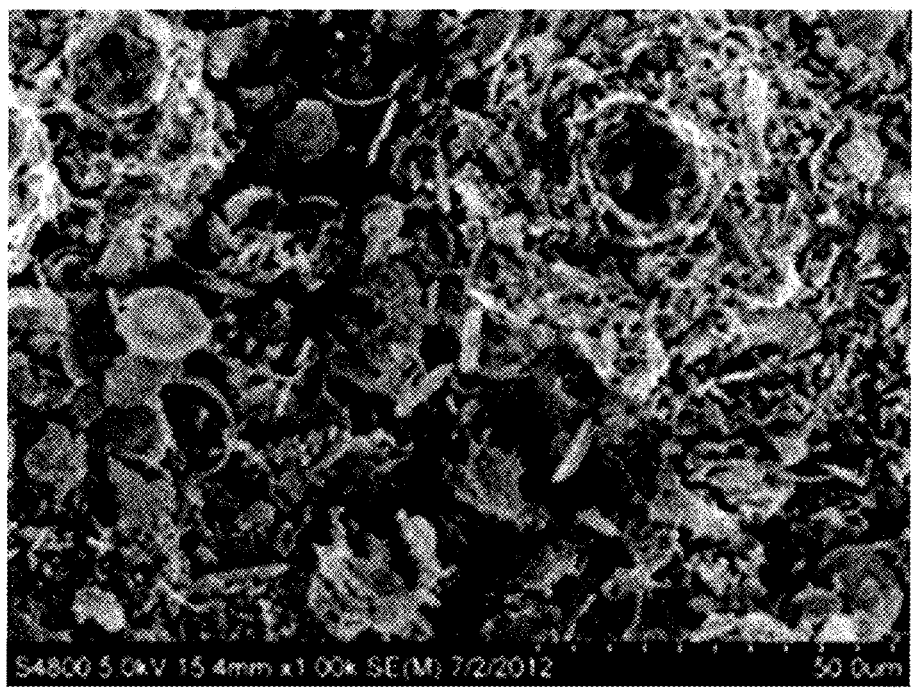
Figure 4:
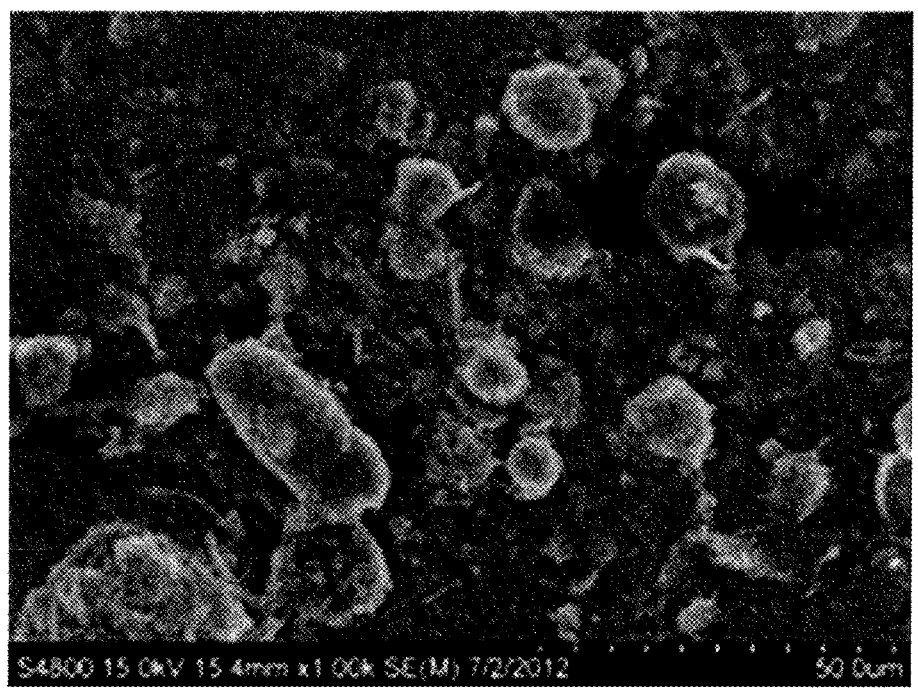
Figure 5:
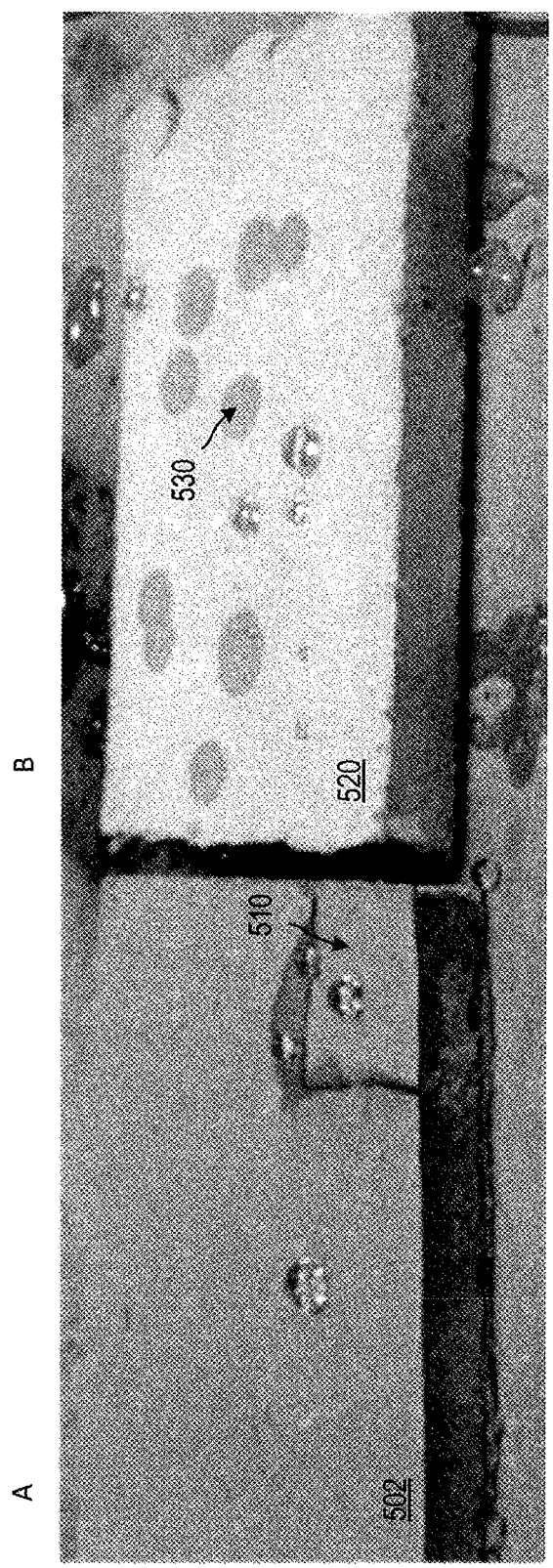
Figure 6:
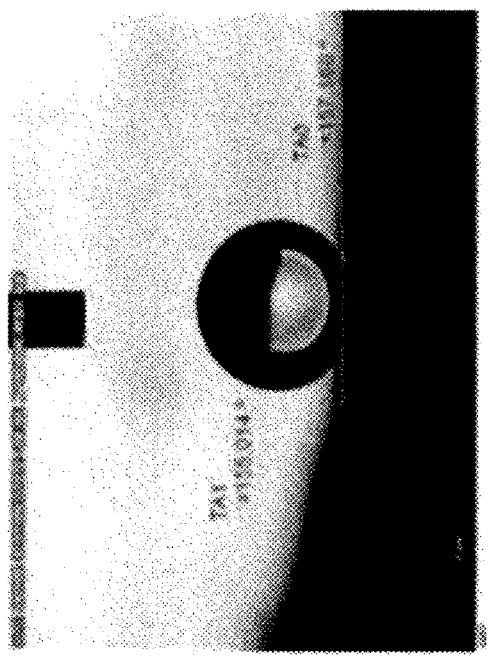
Figure 7:
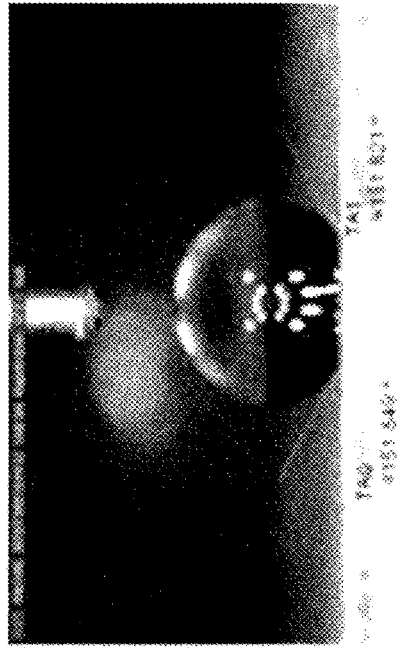
Figure 8:
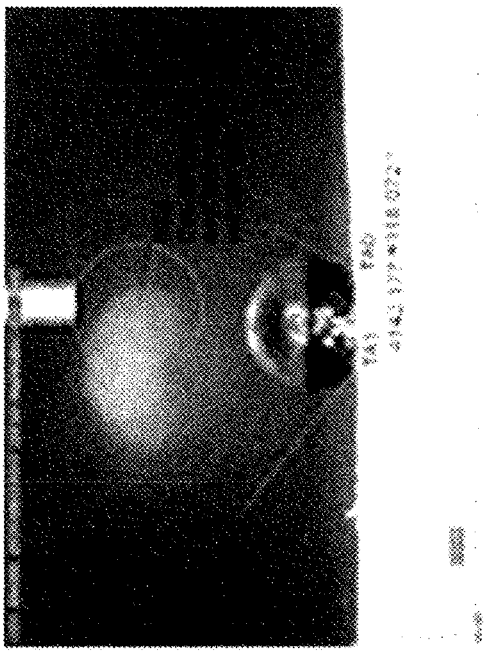
Figure 9:
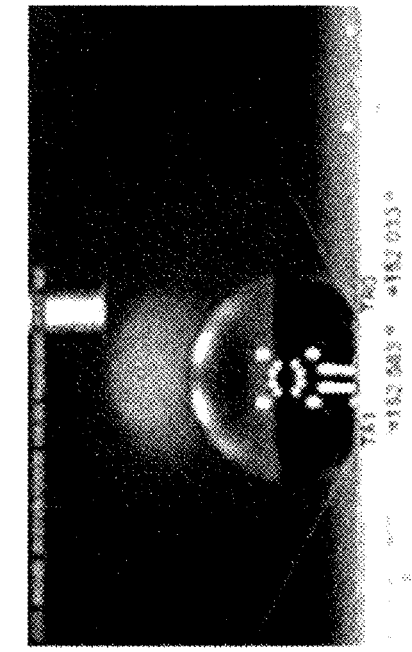
Figure 10:
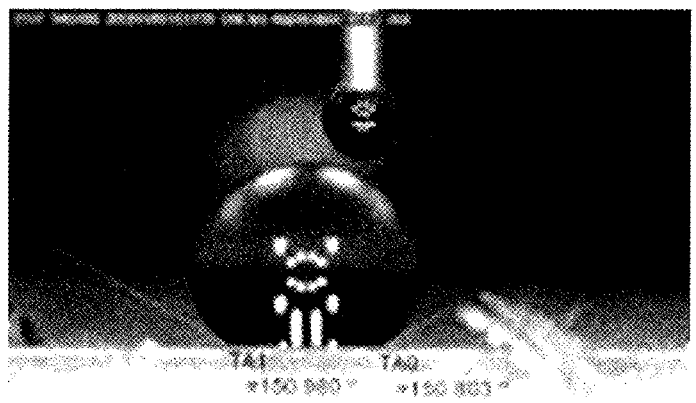
Figure 11:
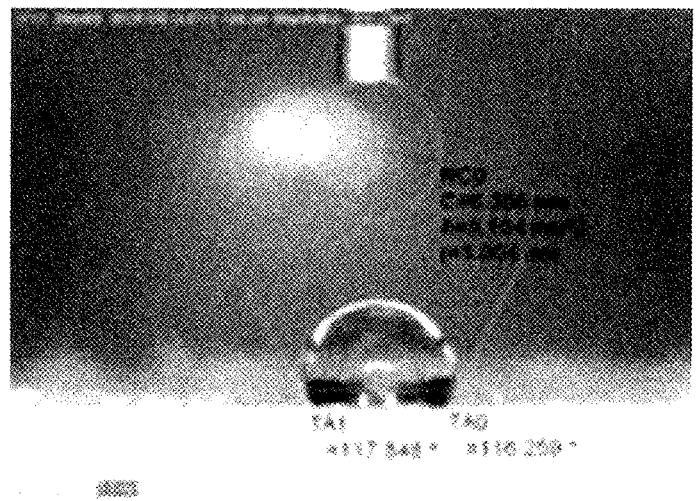
Figure 12:
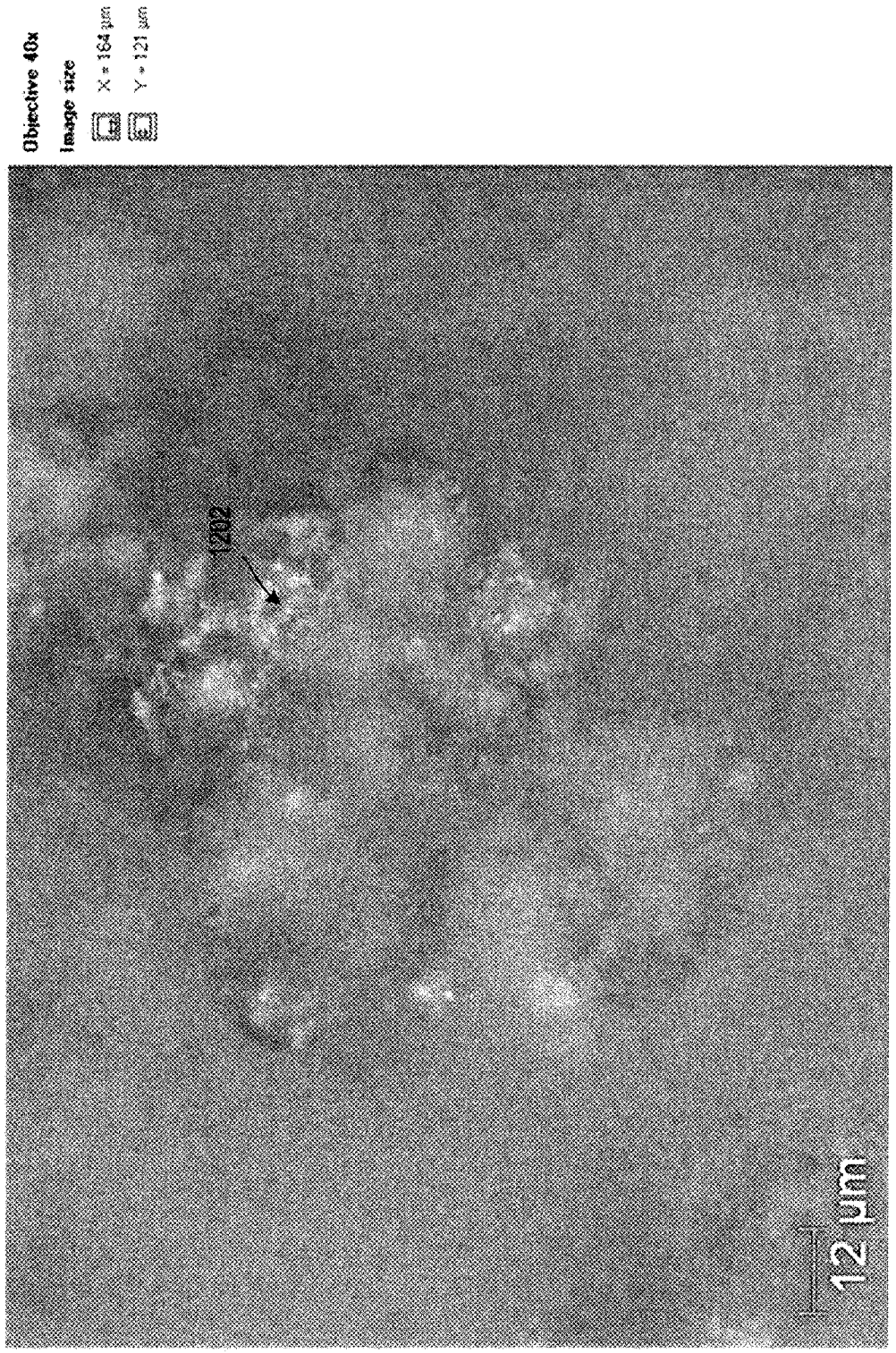
Figure 13:
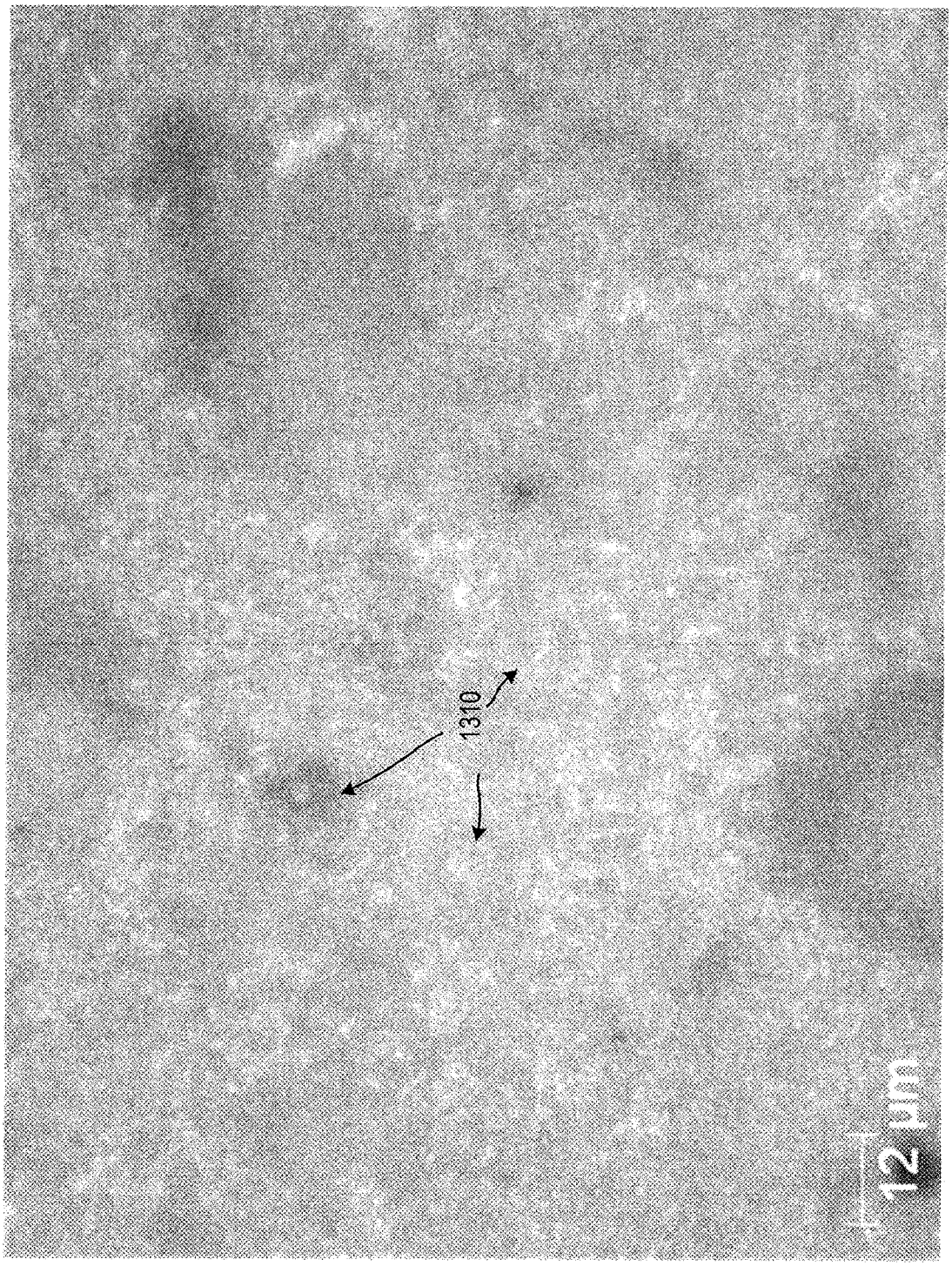
Figure 14:
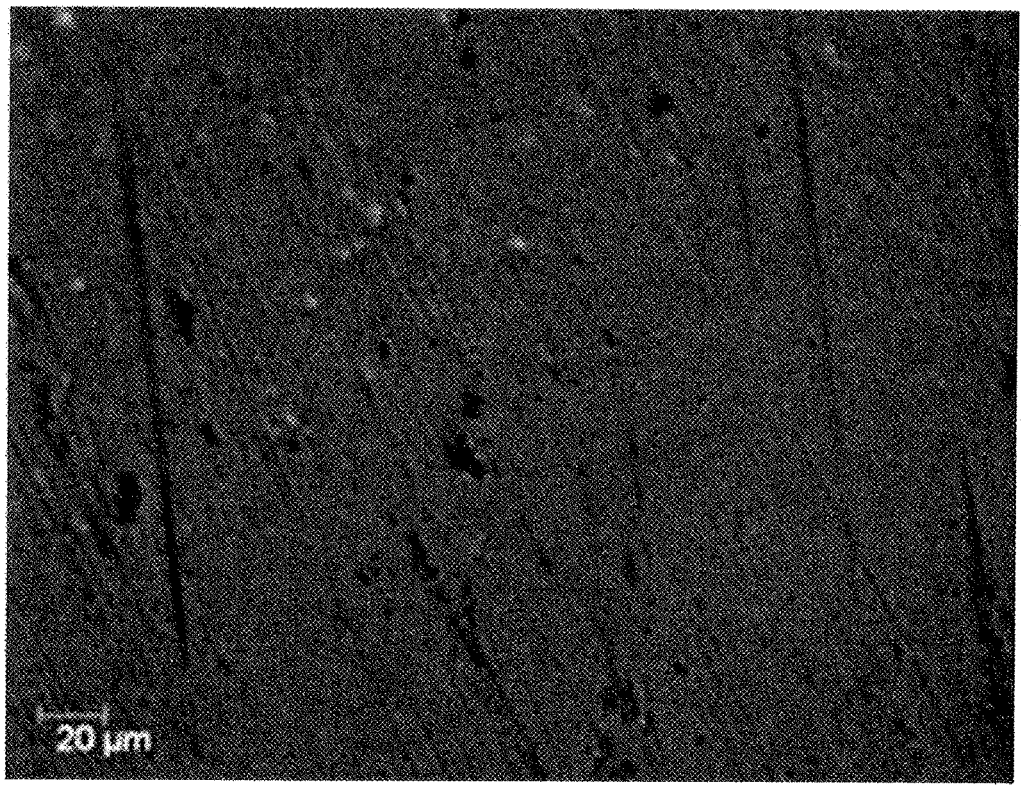
Figure 15:
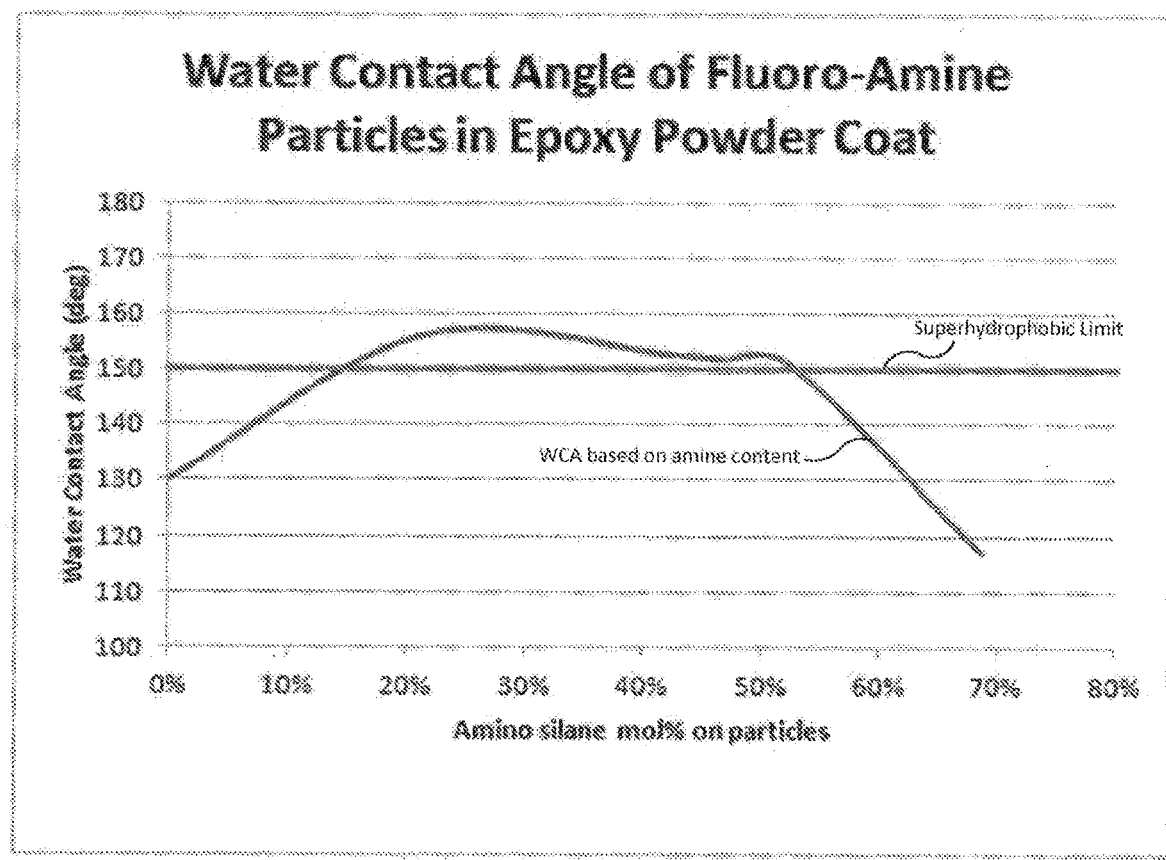

Having thus described embodiments of the invention in general terms, reference will now be made to the accompanying drawings, which are not necessarily drawn to scale, and wherein:

FIG. 1A illustrates a multifunctional particle in accordance with various embodiments of the disclosure;

FIG. 1B illustrates a multifunctional particle having both blooming and optional anti-microbial moieties in accordance with various embodiments of the disclosure;

FIG. 2 illustrates functionalized diatomaceous earth particles treated with ninhydrin in accordance with various embodiments;

FIG. 3 illustrates a scanned image of a Scanning Electron Microscopy (SEM) image of an epoxy coating with multifunctional particles in accordance with various embodiments;

FIG. 4 illustrates a scanned image of a Scanning Electron Microscopy (SEM) image of an epoxy coating with fluorinated diatomaceous earth particles in accordance with various embodiments;

FIG. 5 illustrates an image of (A) a sample of wallboard having a superhydrophobic epoxy coating applied thereto and (B) a sample of wallboard having a polyvinyl chloride coating applied thereto in accordance with various embodiments;

FIG. 6 illustrates an image of a water drop contact angle for characterizing the hydrophobicity of a surface in accordance with various embodiments;

FIG. 7 illustrates an image of a water drop contact angle for characterizing the hydrophobicity of a surface in accordance with various embodiments;

FIG. 8 illustrates an image of a water drop contact angle for characterizing the hydrophobicity of a surface in accordance with various embodiments;

FIG. 9 illustrates an image of a water drop contact angle for characterizing the hydrophobicity of a surface in accordance with various embodiments;

FIG. 10 illustrates an image of a water drop contact angle for characterizing the hydrophobicity of a surface in accordance with various embodiments;

FIG. 11 illustrates an image of a water drop contact angle for characterizing the hydrophobicity of a surface in accordance with various embodiments;

FIG. 12 illustrates a SEM image of asphalt with diatomaceous earth particles in accordance with various embodiments;

FIG. 13 illustrates a SEM image of an epoxy coating with diatomaceous earth particles in accordance with various embodiments;

FIG. 14 illustrates a SEM image of unmodified asphalt in accordance with various embodiments; and FIG. 15 illustrates a chart of water contact angle of fluoro-amine particles in epoxy powder coat as a function of amino silane molecule percentage on the particle.

DETAILED DESCRIPTION

Embodiments of the present disclosure will now be described more fully hereinafter with reference to the accompanying drawings, in which some, but not all, embodiments are shown. Indeed, the disclosure may be embodied in many different forms and should not be construed as limited to the embodiments set forth herein; rather, these embodiments are provided so that this disclosure will satisfy applicable legal requirements. Additionally, while embodiments are disclosed as "comprising" elements, it should be understood that the embodiments may also "consist of" elements or "consist essentially of" elements. Where possible, any terms expressed in the singular form herein are meant to also include the plural form and vice versa unless explicitly stated otherwise. Also, as used herein, the term "a" and/or "an" shall mean "one or more," even though the phrase "one or more" is also used herein. Like numbers refer to like elements throughout.

The multifunctional particles disclosed herein are configured to maintain superhydrophobicity but have functional groups available for chemical reactions, and such particles provide for migration or blooming to the surface of a matrix, e.g., polymers, to increase superhydrophobicity of the matrix surface. In some embodiments, the multifunctional particle also enhances adhesion of the silica particle to polymers and other materials. The multifunctional particle is capable of forming durable bonds, such as covalent bonds, between organic and inorganic materials. The multifunctional particle is further capable of reacting with a substrate and presenting an increased number of sites with reactivity specific for and accessible to the matrix phase.

The embodiments of the disclosure presented herein are directed to particles with multifunctionality. The multifunctional particles are superhydrophobic, chemically reactive, and migrate or bloom to the surface of hydrophobic matrices such as polymers in which they may be included. The multifunctional particle includes a surface and one or more moieties associated therewith that provide functional characteristics to the multifunctional particle. In an embodiment, the multifunctional particle includes a surface, a hydrophobic moiety, a reactive moiety, a migratory or blooming moiety, and/or an anti-microbial moiety. In some embodiments, a single moiety provides multiple functional characteristics. For example, a single moiety may be both hydrophobic and anti-microbial. Similarly, a single moiety may be both reactive and migratory, e.g., capable of blooming.

The multifunctional superhydrophobic nanoparticles have been demonstrated herein through reaction-based color change of multifunctional particles that maintain their superhydrophobicity when coupled to a polymer. The structure of the multifunctional particle can also be modified with hydrophilic moieties to increase migration of the compound to the surface of polymers. In further embodiments, a hydrophobic moiety, a reactive moiety, and/or a hydrophilic or blooming moiety are coupled to the surface of the particle and form a continuous, functional SAM (self-assembled monolayer) on the substrate.

Multifunctional Particle

The multifunctional particle includes a surface that has one or more reactive groups, such as hydroxyl, thiol, or amine. A first moiety is coupled to the surface and has at least one substantially hydrophobic appendage. A second moiety is coupled to the surface and has at least one appendage comprising a reactive functional group and a substantially hydrophilic repeating unit. In this configuration, the particle is substantially superhydrophobic as a result of the hydrophobic appendage, chemically reactive as a result of the reactive functional group, and capable of migrating to a surface of a hydrophobic matrix in which the particle may be included as a result of the hydrophilic repeating unit. In some embodiments, at least one of the moieties includes an anti-microbial functional group. In a further embodiment, the particle includes a third moiety coupled to the surface and having a hydrophilic functional group in addition to or different from the hydrophilic repeating unit in the second moiety.

Hydrophobic surfaces bind very weakly with water, which makes drops of water form beads on the surface. A hydrophobic surface is generally defined and is defined herein as that which has a contact angle greater than 90° with a drop of water. A super-hydrophobic surface is defined herein as that which has a contact angle greater than 150° with a drop of water at normal ambient temperatures (about 25° C.).

Although the multifunctional particles are generally described in terms of superhydrophobicity, chemical reactivity, anti-microbial activity, and blooming functionality, it will be understood that any number of other properties or functionalities may also be attributable to the multifunctional particles. For example, other functionalities may include use as indicator compounds, and to provide corrosion resistance, insulation, and the like. Metal particles fabricated in accordance with the methods disclosed herein can impart anti-static, thermal/electrical conductance, or electromagnetic shielding properties to matrixes devoid of such properties.

In one aspect of the present disclosure, the multifunctional particle includes a surface to which various moieties conferring different functionalities can be coupled. In an embodiment, the particle is a metal or other inorganic, such as a silica or $SiO_2$-containing particle. The surface of $SiO_2$-containing particles may include functional sites to which moieties can couple, such as via covalent bonds, ionic bonds, or van der Waals forces. Exemplary silica particles include diatomaceous earth particles, fumed silica, fused silica, rice husk ash particles, and the like. Other particles that can be used include nanoparticles of transition metals. Other inorganics include nanoparticles of silicon carbide, aluminum oxide, aluminum nitride, silicon, germanium, titanium oxide, tin oxides, copper oxides, and the like. The particles can be nanoparticles or a mixture of nanoparticles and micron sized particles.

Diatomaceous earth is a chalk-like, soft, friable, fine-grained, siliceous sedimentary rock usually light in color, although white when pure. It is finely porous and low in density such that it floats on water until its surface is wetted. Diatomaceous earth is chemically inert to most liquids and gases. It also displays low thermal conductivity and a high fusion point. The typical chemical composition of diatomaceous earth is about 86% silica, 5% sodium, 3% magnesium, and 2% iron.

In certain aspects, natural grade diatomaceous earth particles are processed at up to 800° C. to produce a powder. The processing of natural-grade diatomite consists of crushing and drying. Crude diatomite commonly contains up to 40 percent moisture and can include more than 60 percent water. Typically, a primary crushing is carried on the mined material to yield a desired aggregate size of crushed diatomaceous earth. The crushed diatomaceous earth is subsequently milled and dried simultaneously. Flash and rotary dryers are used to dry the material to a powder of approximately 15 percent moisture. Typical flash dryer operating temperatures range from 70 to 430° C. In an embodiment, the heat treatment of the diatomaceous earth is up to 800° C. In an embodiment, the heat treatment is up to 650° C. The suspended particles exiting the dryer pass through a series of fans, cyclones, and separators. These sequential operations separate the powder into various sizes, remove waste impurities, and expel the absorbed water. These natural-milled diatomite products are then bagged or handled in bulk without additional processing.

The surface of natural grade diatomaceous earth is that of amorphous silica, more similar in composition to that of precipitated silica rather than pyrogenic silica (fumed silica). There is a reasonably high silanol content to the diatomaceous earth surface that can be characterized as having strong hydrogen bonded silanols, moderate strength hydrogen bonded silanols and weak hydrogen bonded silanols.

In certain aspects, the presence of at least some moderate strength hydrogen bonded silanols on the diatomaceous earth particles provides sufficient sites for bonding of a functional coating layer and thereby stabilizes a hydrophobic self-assembly monolayer coating. Consequently, in one aspect, the present disclosure excludes diatomaceous earth nanoparticles heat-treated in excess of 800° C.

Fumed silica, also known as pyrogenic silica or fumed silicon dioxide, comprises submicron-sized spheres, which are fused into short, highly-branched chains, from 0.1 to 0.2 microns in length. Fumed silica is generated by exposing to a silicon-containing compound to a flame. For example, fumed silica can be generated by burning a mixture of a fuel, such as hydrogen, a silicon compound, such as a silane or an organosilane, and oxygen or an oxygen containing gas in a combustion chamber. The fumed silica spheres are substantially uniform in size for a given product and the chain lengths may vary from 5 to 50 units in length. The structure of fumed silica results in a large surface area relative to its size and includes many SiOH (silanol) groups for coupling to alkoxysilanes, germanium alkoxy esters, alkoxyltin, sono-, di-, and tri-halogen silanes germanes. In some embodiments, fumed silica has a surface area of 50-600 $m^2/g$. Tin and titanates etc. can also be used (hereinafter collectively referred to as alkoxysilanes as an exemplary embodiment). The structure of fumed silica is amorphous and includes a number of hydroxyl groups per square millimicron of silica surface (e.g., 3-5 hydroxyl groups/square millimicron of silica surface).

Fused silica, also known as fused quartz, is a noncrystalline (glass) form of silicon dioxide. Fused silica is manufactured by flame hydrolysis or by melting silica oxide and cooling the resulting liquid to a solid having its own unique properties. Fused silica is a non-combustible, non-reactive solid material produced by carbon arc, plasma arc, gas fired continual extrusion, or carbon electrode fusion. Hydroxyl groups are present in fused silica, but typically at a lower rate than fumed silica.

Rice husk ash particles are the result of combustion of rice hulls, which contain silica and other compounds for protecting the seed during the growing season. By burning the rice hulls, the organic material is freed from the rice husk ash and the silica is available for use in generating multifunctional particles.

Diatomaceous earth, fumed silica, fused silica, and rice husk ash particles are all $SiO_2$-containing particles that may be used in a multifunctional particle in accordance with the present disclosure. All of these $SiO_2$-containing particles include hydroxyl groups that an alkoxy silane may react or couple to in order to provide functionality to the nanoparticle. The process by which the $SiO_2$-containing particles are generated may affect the properties of the resultant particle. For example, the process may affect the number of hydroxyl groups or presence of impurities in the multifunctional particle.

In an embodiment, a moiety having at least one substantially hydrophobic appendage is coupled to the surface of the $SiO_2$-containing particle. For example, the hydrophobic moiety may be covalently bonded to the $SiO_2$-containing particle via reaction of a functional group of the hydrophobic moiety with silanol groups about the surface of the $SiO_2$-containing particle. In some embodiments, the hydrophobic moiety is ionically bonded to the $SiO_2$-containing particle. The hydrophobic moiety may also be coupled to the $SiO_2$-containing particle via van der Waals forces. The hydrophobic moiety provides superhydrophobic functionality to the multifunctional particle. In one aspect, the hydrophobic moiety comprises mono-, di-, or tri-alkoxysilane groups with at least one hydrophobic appendage for coupling with the silanols or other reactive surface groups of the particle and providing a moiety with a hydrophobic appendage. While other moieties are feasible in carrying out the methods disclosed, for brevity, the use of alkoxysilane moieties are hereafter used to exemplify the concept, such hydrophobic moieties hereinafter referred to as a "hydrophobic silane moiety."

Exemplary hydrophobic silane moieties include a molecule of the structure:

$X_y(CH_3)_{(3-y)}SiLR$
where y is 1 to 3;
X is —Cl, —Br, —I, —H, HO—, R'HN—, R'$_2$N—, imidizolo, R'C(O)N(H)—, R'C(O)N(R")—, R'O—, $F_3$CC(O)N(H)—, $F_3$CC(O)N(CH$_3$)—, or $F_3$S(O)$_2$O—, where R' is a straight or branched chain hydrocarbon of 1 to 4 carbons and R" is methyl or ethyl;

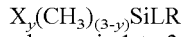

L, a linking group, is —CH$_2$CH$_2$, —CH$_2$CH$_2$CH$_2$, —CH$_2$CH$_2$O, —CH$_2$CH$_2$CH$_2$O, —CH$_2$CH$_2$C(O), —CH$_2$CH$_2$CH$_2$C(O), —CH$_2$CH$_2$OCH$_2$, —CH$_2$CH$_2$CH$_2$OCH$_2$; and R is —(CF$_2$)nCF$_3$ or —(CF(CF$_3$)OCF$_2$)$_n$CF$_2$CF$_3$, where n is 0 to 24.

Exemplary hydrophobic silane moieties include fluoralkylsilanes (e.g., 1H,1H,2H,2H-perfluorooctyltrimethoxysilane) and alkylsilanes (e.g., octadecyltrichlorosilane).

For example, the hydrophobic silane moiety may be a fluorinated silane such as:

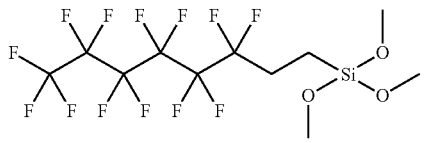 [SMILES: CO[Si](CCC(F)(F)C(F)(F)C(F)(F)C(F)(F)C(F)(F)C(F)(F)F)(OC)OC]

In this example, the fluorinated silane is coupled to the $SiO_2$-containing particle via the reaction of the methoxy groups of the silane and the silanols of the nanoparticle and results in a nanoparticle compound that at a sufficient loading can provide a superhydrophobic characteristic to a matrix, such as polymer, in which the nanoparticle compound is distributed, dispersed, or compounded.

In some embodiments, the hydrophobic silane moieties provide functionality in addition to superhydrophobicity to the multifunctional particle. In one embodiment, the hydrophobic silane moiety is configured to possess anti-microbial activity via one or more functional groups. In one embodiment, the general antimicrobial agent is a quaternary ammonium silane (QAS), or alternatively a quaternary ammonium compound (QAC). The term QAC generally refers to the subgroup of linear alkyl ammonium compounds that are composed of a hydrophobic alkyl chain and a hydrophilic counterpart. These generally have a long hydrocarbon chain (12-18 carbon atoms). In some embodiments, a silane base bonds to a surface of a nanoparticle and above that lies a positively charged molecule that attracts microbes down onto a long carbon chain extending from the base. The positively charged molecule may be a nitrogen molecule. The long carbon chain physically ruptures the organism without leaching into the environment. The long carbon chains are arranged so closely that microbes cannot slip between them.

In an embodiment, the positively charged molecule is a quaternary ammonium (conventionally NR$_4$+, where R is up to 4 different organic molecular groups), but could be another positively charged molecule embedded in the silane chain. For example, alternatives may include cationic surfactants, didecyl dimethyl ammonium chloride (DDAC), or benzalkonium chloride (BAC).

In an embodiment, the hydrophobic silane moiety may include a quaternary ammonium salt functional group, such as but not limited to 3-trimethoxy silyl propyl dimethyl octadecyl ammonium chloride:

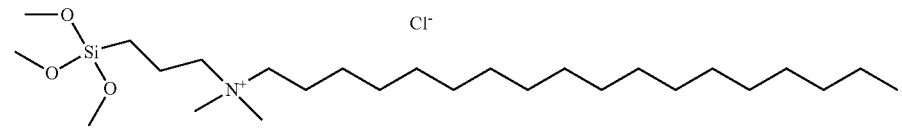 [SMILES: CCCCCCCCCCCCCCCCCC[N+](C)(C)CCC[Si](OC)(OC)OC ; [Cl-]]

In an embodiment, the hydrophobic silane moiety possesses a hydrophobic segment (e.g., the octadecyl appendage) and one or more types of hydrophobic silane moieties may be coupled to the surface of the particle to provide hydrophobic and/or anti-microbial activity to the multifunctional particle. In further embodiments, a hydrophobic silane moiety comprises a hydrophobic chain and a polar embedded compound. These compounds include a polar group near the portion of the moiety that couples to the $SiO_2$-containing compound and a long hydrophobic tail.

In still further embodiments, non-QAC compounds may be used as antimicrobial moieties in the multifunctional nanoparticle. For example, heavy metal ions like copper and silver may be used as antimicrobial agents. In an embodiment, a silane with a long hydrocarbon chain that is capped by a silver or copper ion is coupled to the multifunctional nanoparticle. For example, a reactive silane may be coupled to a $SiO_2$-containing nanoparticle, and then silver nitrate may be reacted to the silane to chemically graft the silver ions to the particle. Similarly, copper-containing compounds may be reacted to the silane to generate anti-microbial nanoparticles.

In some embodiments, a non-antimicrobial hydrophobic silane moiety, e.g., a fluorinated silane, may be coupled to the surface to provide hydrophobic functionality to the multifunctional particle. Similarly, an anti-microbial silane moiety that is not hydrophobic may also be coupled to the surface to provide an anti-microbial silane moiety. In some embodiments, a single silane moiety, such as 3-trimethoxy silyl propyl dimethyl octadecyl ammonium chloride, is both hydrophobic and anti-microbial when coupled to the surface. In other embodiments, however, multiple types of silane moieties are coupled to the surface to selectively provide functionality in addition to the hydrophobic and reactive functionality.

In an embodiment, a moiety having at least one appendage comprising a reactive functional group and a hydrophilic repeating unit is coupled to the surface of the particle. In one aspect, this moiety comprises mono-, di-, or tri-alkoxy silane, the hydrophilic repeating unit, and the reactive functional group, and is hereinafter referred to as the "reactive silane moiety." The reactive silane moiety may be coupled to the surface via covalent bonds, ionic bonds, or van der Waals forces. In some embodiments, the reactive silane moiety comprises a reactive functional group (e.g., a functional end cap) that is configured to couple to a surface other than the particle or allow for copolymerization of the particle into polymer chains. In an embodiment, the reactive silane moiety further comprises a hydrophobic or hydrophilic linker chain. In still further embodiments, the reactive silane moiety further comprises a group configured to couple to the surface of the particle. In an embodiment, the linker chain is a hydrophilic repeating unit positioned between the reactive functional group and the group configured to couple to the surface of the particle.

In some embodiments, the linker chain in the reactive silane moiety is substantially hydrophobic. In an exemplary embodiment, the hydrophobic chain is selected from the group consisting of fluorocarbon and silicone-polymer based (polydimethylsiloxane) and still features a positively charged group at the base. For example, the linker chain may include polyethylene or alkyl-like repeating units, such as in N-(2-aminoethyl)-3-aminopropyltrimethoxysilane:

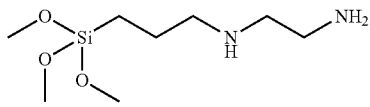

In other embodiments, however, the linker chain is a substantially hydrophilic repeating unit. For example, the linker chain may be oxyethylene or polyethylene glycol-like repeating segments, such as in N-3-[(amino(polypropylenoxy)]aminopropyltrimethoxysilane:

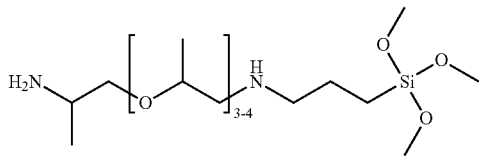

The selection of a hydrophobic linker chain or a hydrophilic linker chain results in functional differences in the particle when combined in a matrix. For example, a hydrophobic segment in the linker chain reduces the surface energy imbalance between the multifunctional particle and a hydrophobic matrix within which it may be included. In one example, a multifunctional particle that has a hydrophobic linker chain in the reactive silane moiety has a reduced surface energy imbalance when the multifunctional particle is included in a polymer, which is also hydrophobic. As a result, the multifunctional particle is more stable in the matrix of the polymer than a particle having a higher surface energy imbalance. The particle therefore distributes evenly throughout the matrix when dispersed therein.

In another embodiment, the reactive silane moiety has a hydrophilic linker chain between the reactive functional group and the surface of the particle. The hydrophilic linker chain increases the surface energy imbalance between the multifunctional particle and the hydrophobic matrix within which it is included. In some embodiments, the hydrophilic linker chain is an oxyethylene or a polyethylene glycol-like chain. In further embodiments, the hydrophilic linker chains include polyamines, unsaturated polymers, hydroxyl-based silicones, and the like. In some embodiments, the surface energy of the polymer is identified and the linker chain is selected to result in a different surface energy than the polymer. As a result, the multifunctional particle migrates to the surface of the polymer, also known as blooming. Presence of the hydrophobic multifunctional particles on the surface of a polymer may increase the magnitude of the superhydrophobicity of the polymer, may increase the duration of the superhydrophobic functionality, and/or may reduce the ratio of multifunctional particle to polymer used to generate the superhydrophobic polymer When a hydrophilic repeating unit such as an oxyethylene or a polyethylene glycol-like chain is used, the moiety is preferably chosen such that it has a reactive functional end group to bond with the polymer matrix. The functional end group can couple directly to the polymer, such as via a silylsulfonylazide, or the functional end group can couple to an additive in the polymer that enhances chemical bonding of the polymer, such as a maleic anhydride co-polymer (Eastman Epolene, Dow Chemical Amplify GR).

In an embodiment, the reactive silane moiety includes a functional end cap configured to couple the multifunctional particle to a polymer or other material. It should be understood that the functional end cap may be selected from a variety of reactive groups selected based on ability to couple to compounds of interest, such as polymers or other surfaces. For example, the functional end cap may comprise an amine group.

In some embodiments, the reactive functional end group is determined by the polymer system in question and chosen so as to maximize the covalent bonding of the system. For example, a polyethylene-maleic anhydride polymer system would use superhydrophobic particles that have amino or epoxysilanes for coupling agents. For an acrylate system (such as ethyl acrylate polymer, Dow Chemical Amplify EA) a functional end group could be an amine, vinyl, or acrylates.

If a vinyltrimethoxysilane-grafted polymer, such as Syncure, is used, a double ended silane such as 1,8-bis(triethoxysilyl)octane (hydrophobic linker) or bis(3-triethoxysilylpropyl)polyethylene oxide (hydrophilic linker) can be used in order to extend coupling sites from the surface of the particle out from under the steric hindrance effects of hydrophobic silanes. Similarly, particles functionalized with vinyl or methacrylatoxy groups can be coupled to polyolefins in the presence of peroxides.

In addition, some particles can be developed in which the reactive silane moiety has a masked functionality that is opened up for bonding under certain circumstances. This is similar to the sulfonylazides that open at high temperatures to reveal azide groups capable of injection into polyethylene. Silanes are available which are masked until exposure to moisture (for single component liquid-cure epoxy) or elevated temperatures (isocyanate functionality, for resin systems that cure between 160-200° C.). Use of these reactive silane moieties can provide applications in different coating systems such as packaging these particles into single component epoxies to increase shelf life without preemptive reaction in the storage system.

Exemplary reactive silane moieties that include reactive functional groups include amine silanes, olefin silanes, anhydride silanes, epoxy silanes, halogen silanes, hydroxyl silanes, dipodal silanes, acrylate silanes, sulfur-containing silanes, water based silanes, isocyanate silanes, azide silanes, and/or combinations thereof.

Exemplary amine silanes include: n-(2-aminoethyl)-3-aminopropyltrimethoxysilane, 3-aminopropyltriethoxysilane, 3-aminopropyltrimethoxysilane, n,n'-bis[3-(triethoxysilyl)propyl]urea, ureidopropyltrimethoxysilane, 3-aminopropylmethyldiethoxysilane, n,n'-bis[(3-trimethoxysilyl)propyl]ethylenediamine, n1-(3-trimethoxysilylpropyl)diethylenetriamine, m-aminophenyltrimethoxysilane, n-(3-triethoxysilylpropyl)-4,5-dihydroimidazole, n-methyl-aminopropyltrimethoxysilane, 3-aminopropyltris(methoxyethoxyethoxy)silane, ureidopropyltriethoxysilane, n-(2-aminoethyl)-3-aminopropylmethyldimethoxysilane, and/or combinations thereof.

Exemplary olefin silanes include: styrylethyltrimethoxysilane, methacryloxypropyl-trimethoxysilane, vinyltriethoxysilane, triethoxysilyl modified poly-1,2-butadiene, vinylethoxysiloxane homopolymer, vinyltriacetoxysilane, vinylmethoxysiloxane homopolymer, allyltrimethoxysilane, vinyltriisopropoxysilane, and combinations thereof.

Exemplary anhydride silanes include (3-triethoxysilyl) propylsuccinic anhydride. Exemplary epoxy silanes include 2-(3,4-epoxycyclohexyl)ethyltrimethoxysilane, (3-glycidoxy-propyl)trimethoxysilane, and combinations thereof.

Exemplary halogen silanes include: ((chloromethyl)phenylethyl)trimethoxysilane, p-chloromethyl)phenyltrimethoxysilane, and combinations thereof.

Exemplary hydroxyl silanes include n,n-bis(2-hydroxyethyl)-3-aminopropyltriethoxysilane. Exemplary dipodal silanes include: bis(3-trimethoxysilylpropyl)amine, tris(3-trimethoxysilyl propyl)isocyanurate, 1,6-bis(trimethoxysilyl)hexane, vinylmethoxysiloxane homopolymer, n,n'-bis[(3-trimethoxysilyl)propyl]ethylenediamine, trimethoxysilylpropyl modified (polyethylenimine), bis(t-rimethoxysilylethyl)benzene, 1,8-bis(triethoxysilyl)octane, and combinations thereof.

Exemplary acrylate silanes include: (3-acryloxypropyl) trimethoxysilane, methacryloxypropyl-trimethoxysilane, and combinations thereof.

Exemplary isocyanate silanes include 3-isocyanatopropyltriethoxysilane and the like.

Exemplary sulfur silanes include: 3-mercaptopropyltrimethoxysilane, 3-mercaptopropyl-methyldimethoxysilane, bis[3-(triethoxysilyl)propyl]tetrasulfide, 3-methacryloxypropyl-bis(trimethylsiloxy)methylsilane, and combinations thereof.

Exemplary waterborne silanes include: aminopropylsilsesquioxane in aqueous solution, aminoethylaminopropylsilsesquioxane in aqueous solution, and the like.

Exemplary azide silanes include 6-azidosulfonylhexyltriethoxysilane and the like.

In some embodiments, a molar ratio of approximately 1:3 (0.31:0.69) reactive silane moieties to hydrophobic silane moieties is used. For example, this ratio may be used when the multifunctional nanoparticle is used in wet polymer coatings (polymers dissolved in solvents). This ratio has been found to provide good superhydrophobic performance and durability. In some embodiments, varying the ratio will optimize the particles for different applications and binder polymers. For example, when used in an epoxy powder coating application, a 1:1 molar ratio of reactive silane moiety to hydrophobic silane moiety has increased durability while maintaining superhydrophobicity. FIG. 15 discloses a chart of water contact angle (WCA) of flouro-amine particles in epoxy powder coat at varying percentages of amino silane molecules (i.e., reactive silane moieties) on the particle. As shown in FIG. 15, a reactive silane moiety percentage of from 20 to 50% of the number of moieties on the particle results in a water contact angle above 150° and therefore a superhydrophobic characteristic.

In further embodiments, the molar ratio of the reactive silane moiety to the hydrophobic silane moiety is 1:1, 3:1; 1:3, 1:10, or 10:1. The predicted characteristics of the resulting polymer/particle combinations based on the molar ratio of reactive/hydrophobic moieties on the particle is presented in Table 1. It should be understood that other ratios, such as 1:2, 2:1, 1:4, 4:1, 1:6, 6:1, 1:8, and 8:1 reactive silane moiety to hydrophobic silane moiety may be used.

TABLE 1

| Molar Ratio Reactive:Hydrophobic | Durability | Superhydrophobicity | Applications |
| --- | --- | --- | --- |
| 1:3 | High | High | High end coatings |
| 1:1 | High | Medium | Decreased cost |
| 3:1 | High | Low | Blooming (likely) |
| 1:10 | Low | Very High | Low wear requirements |
| 10:1 | High | Low | TBD |

In some embodiments, the reactive silane moiety and the hydrophobic silane moiety are selected to reduce or minimize steric effects. For example, a reactive silane moiety and a hydrophobic silane moiety having about the same size or length may be coupled to the particle. The size or length of the moieties can be determined based on the length of chains making up part of the moieties. For example, the hydrophobic silane moiety and the reactive silane moiety may have an equal length hydrocarbon chain. In this way, the silane moieties do not substantially interfere with one another and prevent either adhesion or hydrophobicity from occurring.

In further embodiments, a silane moiety can be added to the surface to provide dedicated blooming functionality. For example, a silane moiety can be selected that does not result in hydrophobicity or reactivity to target compounds, but instead is coupled to the surface to provide migrating or blooming functionality. In this manner, one silane moiety can be used for hydrophobic traits, one silane moiety can be used to couple the particle to a binder, resin, or other material, and one silane moiety can be used to provide or increase the blooming potential of the particle in substances.

As discussed, a silane moiety can also be used to provide anti-microbial activity or other antibiotic activity, e.g., anti-viral or anti-fungal, to the multifunctional particle. The silane moiety providing anti-microbial activity may be a dedicated silane moiety that is coupled to the surface for that purpose, or the silane moiety may provide multiple functionalities, such as being both anti-microbial and hydrophobic.

In some embodiments, a silane moiety is coupled to the surface and functionalized to serve as an indicator for applications such as biological, biomedical, chemical signature identification, drug testing, and the like. For example, a silane moiety functionalized with a ligand that is detectable when coupled to a target molecule may be used to identify the presence of the target molecule.

In one embodiment, biomaterial applications could use diamine or hydroxyl silanes (1,8)bis(triethoxysilyl)octane) for binding oligonucleotides. In another embodiment, DNA receptors could be based on aldehyde, diamine, or epoxy silanes to identify the presence of DNA. For example, an indicator compound could be coupled to the particle and indicate the presence of DNA sequences based on the DNA receptors. Similarly, various proteins could be coupled with amines/amides or sulfur compounds to couple to peptides or amino acid sequences. In still further embodiments, an anti-microbial silane capable of destroying microbes and/or featuring functional silanes to collect DNA or protein signatures may be generated. Another application could have a surface which is tuned to couple to specific proteins or DNA while non-attached proteins or DNA sequences are washed away due to the self-cleaning superhydrophobic properties.

In some embodiments, the order of attachment of the various moieties affects the functional characteristics of the particle. In some embodiments, the hydrophobic silane moiety is coupled to the surface of the silica particle before the reactive silane moiety, the anti-microbial silane moiety, the hydrophilic or blooming silane moiety, and/or a silane moiety providing additional functionality is coupled to the surface of the particle. In an embodiment, the silane moieties are added to the particles in a specific order. In one example, a dual functional particle comprising a QAC and amine compound is formed such that the QAC compound (packaged with chlorine ions) is added first, then rinsed so as to remove the chlorine ions, and then the amine silane is added. In some embodiments, adding the amino silane first would allow the chlorine ions to react with the amine groups and later inhibit application of the particles.

In the case of hydrophilic linker chain silanes (such as silanes that enhance blooming), in some embodiments they are added to the particle first in a water-borne or alcohol system, and then the fluorinated compound is added in a non-polar system. This order is because the hydrophilic silane moieties may not graft to the particles easily in the non-polar system. For example, this tendency has been observed when functionalizing particles with silylsulfonylazides in hexane (the silane did not disperse) compared to ethanol (the silane dispersed and grafted to the particle).

In some embodiments, the time of addition of different moieties can provide additional functionality or improved functionality to the multifunctional nanoparticle or to substances comprising the multifunctional nanoparticle. For example, a particle having a reactive silane moiety and a hydrophobic moiety may bloom to the surface of a polymer or other compound and remain chemically active. A silver nitrate may then be reacted to the particle to chemically graft the silver ions to the particle, resulting in a polymer having a superhydrophobic surface, greater durability, and antibiotic characteristics.

The hydrophobic silane moiety, in some embodiments, is covalently bonded to the surface of the particle at one end. The surface functionalization of the particle can be carried out with the neat hydrophobic silane moiety, or as a precursor in a non-reactive solvent such as a hydrocarbon, an ether, or a fluorinated solvent. In some cases, the particle can have the hydrophobic silane moiety contact its surface from the vapor phase. The surface functionalization can be carried out with an added non-nucleophilic proton acceptor such as a tertiary amine, for example triethylamine or pyridine, to scavenge acidic byproducts of the reaction. A catalyst can be included to accelerate the formation of the self-assembled monolayer. Sol-gel chemistry generally uses water as a catalyst to aid in the silane-grafting mechanism when the silane leaving group is methanol or ethanol. Hydrolysis of the silane and surface are dependent on factors such as the leaving group of the silane, pH of the system, and functionalization method (spray, immersion, etc). These methods often incorporate catalysts to ensure good, secure bonding.

Water can also be included in the formulation. The amount of added water will depend upon the amount of residual water on the pretreated substrate and the nature of the hydrophobic silane moiety used. Water can be introduced as a liquid or a vapor. In many cases, water vapor from ambient air is sufficient to react with the hydrophobic silane moiety to interconnect the hydrophobic silane moiety into the structured stable SAM coating. The time and temperature needed for effective formation of the SAM coating will depend upon the structure of the hydrophobic silane moiety and any solvent, scavenger, or catalyst used. With many of the hydrophobic silane moieties the treatment can be carried out rapidly at normal room temperatures. In some embodiments, temperatures of about 0 to about 100° C. or more can be used. Reaction times can vary from as little as about 2 minutes to about 24 hours depending on the hydrophobic silane moiety and conditions used for the SAM formation. In general, any excess hydrophobic silane moiety and by-products formed during deposition and coupling can be readily removed from the surface by washing or in some cases by applying a vacuum and/or heat.

The resulting particles, which are functionalized with the hydrophobic silane moiety, can be dried before the reactive silane moiety is coupled to the single-function particles. In some embodiments, the single-function particles are rinsed to remove impurities. For example, if a chlorine-containing silane moiety was used to functionalize the surface, then a rinsing procedure can be used to remove the chlorine groups. This is accomplished by taking single silane functionalized silica particles and rinsing in hexane, then filtering and drying the particles to remove residual chlorine groups on the surface. These clean particles are then immersed in hexane and mixed with the reactive silane moiety and water. This allows for the reactive silane moiety to couple to open Si—OH groups on the particle. These available bond sites are due to incomplete functionalization of the particle due to steric effects or short reaction times.

In other embodiments, the reactive silane moiety is coupled to the surface of the particle before the hydrophobic silane moiety is coupled to the surface of the particle. The reactive silane moiety includes hydrolysable groups such as an alkoxy, acyloxy, halogen, or amine, which form reactive SiOH groups upon hydrolysis. Siloxane linkages are formed when the reactive SiOH groups of the reactive silane moiety condense with the SiOH groups on the surface of the silica particles. The resulting silica particles, which are functionalized with the reactive silane moieties, can be dried before the hydrophobic silane moiety or hydrophilic silane moiety are coupled to the single silane functionalized silica particles.

In additional or alternative embodiments, the hydrophobic silane moiety, the reactive silane moiety, and/or silane moieties providing additional functionality are simultaneously coupled to the surface of the particle. For example, hydrophobic silane moieties such as fluorosilanes that have a (m)ethoxy head group termination can be mixed with similarly terminated reactive silane moieties such that both compounds simultaneously couple to the particle. Methoxy and ethoxy silanes can be intermixed for reaction times, such that the methoxy compound will couple before the ethoxy compound. For example, 6-aminohexyl-3-aminopropyltrimethoxysilane (coupling agent) and 1H,1H,2H,2H-perfluorooctyltrimethoxysilane (hydrophobic silane) can be simultaneously mixed with water and hexane to deposit a multifunctional SAM onto silica particles. In this way, trichlorosilanes, which produce chlorine that reacts with the reactive silane moieties, can be avoided. In some embodiments, aminopropylsilanes are used to treat fluorinated diatomaceous earth particles (FDE) to create fluoro-aminodiatomaceous earth.

In further embodiments, the multifunctional particle comprises a predetermined ratio of the hydrophobic silane moiety, the reactive silane moiety, the hydrophilic or blooming silane moiety, and the silane moieties providing other functionality. The ratio of the silane moieties, in some embodiments, is based on the application of the multifunctional particles, the composition formulation of the multifunctional particles, targeted properties, the type of reactive silane moiety, the type of hydrophobic silane moiety, the type of hydrophilic or blooming silane moiety, the type of anti-microbial silane moiety, and the like.

Referring now to FIG. 1A, an exemplary multifunctional particle with long hydrocarbon chains for superhydrophobicity and amino-functional chains for binding to polymers is illustrated. Not shown is the interlinking of silane head groups (—O—Si—O—Si—O—) on the nanoparticle surface. The hydrocarbon chains are shown for simplicity but are interchangeable for fluorocarbon chains.

In FIG. 1B, another exemplary multifunctional particle is shown. The particle is depicted having both blooming and optional anti-microbial functionality in accordance with various embodiments of the disclosure. As shown in FIG. 1B, a silica particle is functionalized with three different types of moieties, exemplified as the reaction products of alkoxysilanes with different moieties A, B, or C, which are: (A) a reactive functional group and a hydrophilic blooming linker moiety; (B) a hydrophobic fluorinated moiety; and (C) a hydrophobic anti-microbial moiety. The resulting multifunctional particle is capable of binding to targets and/or configured to migrate to the surface of hydrophobic polymers via the reactive, hydrophilic moiety. The resulting multifunctional particle provides superhydrophobic characteristics to the surface of the polymer via the hydrophobic fluorinated moiety. Finally, the multifunctional particle can be configured to provide anti-microbial properties to the polymer via the hydrophobic anti-microbial moiety. Other moieties may be added to the multifunctional particle to provide additional functionality.

To demonstrate that the multifunctional particles are chemically reactive, in some embodiments, a chemical indicator can be used to change the color of the particles. For example, ninhydrin can be used for turning treated materials purple. FIG. 2 shows multifunctional particles 200 treated with ninhydrin that have turned purple as a result of the treatment. Non-multifunctional superhydrophobic materials are colored by either fluorinating pigment particles or modifying the particle spacing or orientation in order to take advantage of surface optical properties to produce a color by light refraction and interference.

While this disclosure is focused on multiple functionalization of silica particles, the technology may also be applied to different nanotopographies of inorganic metal oxide materials as particles. For example, silica is an excellent particle for coupling to silanes, but quartz, glass, aluminum, aluminum oxide, zirconium oxide, alumino-silicates, silicon, and copper may also be used as particles. In further embodiments, tin, talc, inorganic oxides (e.g., Fe2O3, TiO2, Cr2O3, etc.), steel, iron asbestos, nickel, zinc, zinc oxide, and lead may be used as particles. While marble, chalk (CaCO3), gypsum (CaSO4), barytes (BaSO4), graphite, and carbon black are less effective particles for coupling to silanes, these may also be the basis by which multifunctional particles are formed in accordance with some embodiments.

Further, while this disclosure focuses on silica particles within compounds such as diatomaceous earth and fumed silica, additional variations of silica and non-silica containing structures may be used. For example, a transparent nanoporous silica substrate can be used to generate transparent superhydrophobic coatings. In this example, the coatings would have both superhydrophobic character and coupling sites for chemical adhesion, such as bonding an oil to the surface, providing ligands or indicators for specific compounds, and providing optical signature materials, etc. In further embodiments, carbon nanotubes that are treated to have functional groups may be used, wherein functionality-providing grafts are coupled to the functional groups similar to silanes and silica particles.

In one embodiment, a general superhydrophobic surface can be impregnated with a perfluorinated oil to result in a "super slippery" surface. In some embodiments, a multifunctional superhydrophobic surface enables the use of a functional perfluorinated silicone or hydrocarbon oil that can bond to adhesive sites on the multifunctional particle. This results in a chemically-bonded oil that has both covalent bonds to the coating and inherent fluorine-fluorine affinity, yet still allows the "super slippery" surface characteristics. The covalent bonds increase the durability of the oil treatment on the material.

In some embodiments, an oleophobic surface is generated by providing functional groups attached to silanes, wherein the functional groups are oleophobic. In still further embodiments, an icephobic surface is generated by providing functional groups attached to silanes, wherein the functional groups are icephobic. The combination of the hydrophobic silane moiety, the reactive silane moiety, the hydrophilic agent, and the oleophobic or icephobic functional groups on the multifunctional compound can be used to generate oleophobic or icephobic substrates that have many uses in industry.

Compositions

Silica particles can be singly functionalized with one chemical to give hydrophobic surface functionality to the particle. Mechanical durability of such surfaces, however, is generally extremely low and thus unusable in real world applications as particles have no surface chemistry to bond to and are generally pinned to the surface mechanically. Polymers generally polymerize around the particles and form voids surrounding them, allowing for mechanical pinning, but this also creates voids and fractures in the material due to the presence of non-polar particles which cannot meld with the polymer. As a result, mechanical brushing or high energy water impacts can easily remove the particles and allow the surface to wet.

Addition of reactive moieties to the nanoparticles allows for strong covalent bonds to couple the nanoparticle to a surface or allow for copolymerization of the particles into polymer chains. These reactive moieties can be selected to specifically bind to a number of materials, allowing for customizable nanoparticles.

Addition of a hydrophilic agent, such as a hydrophilic repeating unit in the reactive silane moiety or a dedicated hydrophilic moiety coupled to the surface of the particle, provides blooming functionality to the multifunctional particle. The hydrophilic repeating unit in the reactive silane moiety does not prevent strong covalent bonds from forming between the nanoparticle and the surface and does not prevent copolymerization of the particles into polymer chains. Similarly, the dedicated hydrophilic moiety couples to the surface and increases the energetic difference between the multifunctional particle and the hydrophobic polymer, thereby increasing blooming and migration of the multifunctional particle to the surface of the polymer. In this way, the blooming moiety increases presentation of the hydrophobic moiety on the surface of the polymer and improves the superhydrophobicity of the polymer.

In some embodiments, a composition comprising the multifunctional particle is provided. In further embodiments, the composition further includes a binder solution for dispersing the multifunctional particles, solvents, water, processing aids, fillers, color agents, biocides, polymers, asphalt, and/or other materials. Exemplary polymers include thermosets, acrylates, methacrylates, polyesters, urethanes, epoxies, phenolics, thermoplastics, polydienes, polyvinyl chloride, polyphenylene sulfide, acrylics, maleic anhydride, vinyl acetate, diene-containing copolymers, halogen-modified homopolymers, chlorosulfonyl-modified homopolymers, polyamides, polyesters, polycarbonates, polysulfones, olefins, and combinations thereof. In some embodiments, the polymers are copolymerized with the multifunctional particles. For example, the presence of a polymer-compatible self-assembled monolayer allows for multifunctional particles to copolymerize with pre-polymers, such as PVC, urethane, epoxies, and thermoresins, which will react with the reactive groups of the reactive silane moiety. In other embodiments, the reactive silane moiety is matched to the targeted polymer. For example, reactive second moieties with amine groups may be better suited to react or bind to fluorocarbons and styrene butadienes and less suited to bind to nitrile and isoprene. In some exemplary embodiments, the composition includes N-(2-aminoethyl)-3-aminopropyltrimethoxysilane or another reactive silane moiety and epoxies, phenolics, melamines, nylons, PVC acrylics, urethanes, nitrile rubbers, thermoset polymers such as dialyphthalate, epoxy imide, melamine, paraffin, phenolic, polyester, urethane, cellulosics, polyacetal, polyamide, polybutylene terephthalate, and polycarbonates, as well as sealants such as polysulfides.

In some cases, when fluorocarbon/amino dual functional diatomaceous earth (FADE) particles are mixed with a pre-polymer, the resulting material has superior properties compared to the mixture having FDE (singly functional fluorinated diatomaceous earth) particles. For example, mixing FDE and PVC (polyvinylchloride) cement results in a delicate superhydrophobic surface (e.g., not durable, easily broken), but mixing FADE with PVC cement results in a mechanically durable material that has very high hydrophobicity because the FADE particles have bonded directly to polymer chains. Additionally, mixing FDE with a silicone thermoresin and heat treating results in a rough, non-durable superhydrophobic material, while using FADE results in a smooth, durable, and robust material that is superhydrophobic.

Additionally, particles can be treated in a "lock-key" fashion in which one set of multifunctional particles can be treated with one side of an adhesive compound, and another set of multifunctional particles can be treated with the other side of the adhesive compound similar to a two-part epoxy adhesive compounds. For example, an epoxy-type of diatomaceous earth package could be formulated in which particles A have an epoxide-silane (epoxy) and particles B have amino-silane (hardener compound). Combining these particles in such a fashion to facilitate a reaction that results in the particles being crosslinked to one another, and the presence of free fluorocarbon chains also gives the epoxy superhydrophobicity. Exemplary reactive silane moieties for use in these epoxy systems include aminosilanes and acrylicsilanes. Mixtures of these compounds form a hard resin material upon heating, which results in particles continuously embedded in a surface having high mechanical durability to brushing or high energy water impacts.

Also provided herein are methods for forming superhydrophobic surfaces using the disclosed multifunctional particles. In some embodiments, the multifunctional particles or a composition comprising the multifunctional particles are introduced to a surface of a substrate. In some exemplary embodiments, the multifunctional particles are applied to the surface of the substrate. For example, a coating comprising the multifunctional particles may be sprayed, brushed, or rolled on the substrate surface, or the substrate may be dipped into the coating. In further embodiments, the multifunctional particles are covalently bonded to the surface of the substrate. In other exemplary embodiments, the multifunctional particles may be mixed with polymer, polymer precursors, or other material and an article may be formed from the polymer with superhydrophobic surface properties, where the blooming functionality of the multifunctional particle then results in the particle or at least a portion of the particles migrating to the surface of the substrate and providing enhanced superhydrophobic characteristics to the resulting product. The article or product having a superhydrophobic surface may be formed by extrusion, reactive injection molding, thermoset molding, injection molding, rotational compression molding, which can optionally involve heat curing, heating, air drying, and the like to assist or facilitate blooming of the multifunctional particles.

EXAMPLES

Preparation of Compositions Comprising Singly Functional Silica Particles:

A) Polyvinylchloride (PVC) Cement Experiment
Combine in a glass beaker:
10.5 g methyl ethyl ketone (MEK)
1.0 g PVC cement
0.1 g 1H,1H,2H,2H-perfluorooctyltrichlorosilane (Rf—Si)
0.5 g FDE (fluorinated diatomaceous earth)

Blend the above mixture for at least 1 minute. Spray onto substrate using a PREVAL® Spray Gun. The mixture results in a surface that is superhydrophobic after drying, but that has low durability. Particles are mechanically pinned to the coating and abrasion can dislodge them. Optionally, spray with a PDMS/Toluene mixture for an oleophobic coating.

B) Aramid Fiber Experiment
Combine:
50 g Acetone
5 g FDE
0.5 g FAS (Fluorocarbon Silane)

Blend the above mixture for 30 seconds, and then pour solution over each side of KEVLAR® (aramid fiber) sample. Resulted in a superhydrophobic surface, but the particles did not stick to the surface of the KEVLAR® sample.

Preparation of Multifunctional Particles:

A) Bonding Reactive Silane Moiety Before Bonding Hydrophobic Silane Moiety i) Formulation A
Combined in glass beaker
12.2 g DE
0.5 g APS (aminopropyltrimethoxysilane)
24.8 g EtOH (ethanol)

Blend the above mixture for 15 minutes. Add 34 g of EtOH to rinse the sides of the glass beaker. Pour EtOH out, leaving 64.6 g total solution. Dip borosilicate slide into the solution, leave immersed in the solution for 1 minute. Spray solution on mesh, plastic, and additional borosilicate slide. Dry coated samples in direct sunlight. Some of the material stuck very well to the glass slide. Adhesion was judged by light finger abrasion. The glass slides from the above experiment had a hard film that was scratch resistant. The solution that was poured into a glass dish had dried out and formed a cake. These cakes were much sturdier than the cakes that result from drying out fluorinated diatomaceous earth.

Mix for 1 minute:
0.6 g Rf—Si
68 g Xylol

Immerse coated glass slide for 1 minute in the above solution. Dry samples overnight in ambient conditions. Mix the remaining aminofunctional diatomaceous earth with Xylol/Rf—Si solution. Dip one glass slide in solution; leave in glass dish overnight. After drying, the amine-functional particles in the glass dish were found to be superhydrophobic. Coated glass slide also showed hydrophobicity.

ii) Formulation B
Combine in a container and blend for several minutes:
100 g Hexane
7 g Diatomaceous Earth
1 g methacryloxypropyltrimethoxysilane
2 mL $H_2O$ It was noted that the reaction was gaseous. The resulting functionalized particles were filtered off with coffee filters, and then rinsed by decanting with hexane. The filtered particles were then heated at 150° F. to dry out the particles.

B) Bonding Hydrophobic Silane Moiety Before Bonding Reactive Silane Moiety i) Formulation A
Rinse particles by blending:
5.0 g FDE
37.1 g Hexane, then decant hexane.
Start with about 32 g of Clean FDE in Hexane:
Add 14.0 g Hexane
Add 1.0 g APTES [(N-(2-aminoethyl)3-aminopropyltrimethoxysilane)]
Blend solution, allow to air dry.

The APTES to diatomaceous earth weight ratio was determined as follows. The wetting surface (ws) of APTES=355 $m^2/g$. Assume the following diatomaceous earth surface area (milled): typical: 10-30 $m^2/g$; DiaSource: 69.05 $m^2/g$; Perma-Guard: 26-28 $m^2/g$; milling estimate: 50-60 $m^2/g$. Calculate the weight ratio to be 1/7th to 1/6th g APTES per g diatomaceous earth.

ii) Formulation B
Rising Step:
Combined in a container:
178.2 g FDE
Rinse 1: 217.5 g Hexane
Rinse 2: 242.6 g Hexane Mix the FDE and the 217.5 g of hexane for 5 minutes with blender. Keep mixture container sealed and allow the FDE to settle. Decant the hexane, and then repeat the above step for Rinse 2. After two rinses, 174.3 g of clean powder resulted.

Batch 1: Combine and blend after every addition:
30.0 g clean FDE (from the rinsing step above)
Add 46.5 g Hexane
Add 5 g (2-aminoethyl)-3-aminopropyltrimethoxysilane
Add 2 mL Distilled $H_2O$
Add 19 g Hexane After the 19 g of hexane is added, mix the Batch 1 for several minutes (solution is hot).

Batch 2: Combine and blend after every addition:
30.0 g clean FDE (from the rinsing step above)
Add 75 g Hexane, plus an additional ~20 g
Add 5 g AHS (aminohexylaminopropyltrimethoxysilane)
Add 2 mL $H_2O$ After the 2 mL of $H_2O$ is added, blend Batch 2 for 5 minutes (solution is hot). Heat both batches at 170° F. to remove hexane.

iii) Formulation C Combine in a Container and in Order:
10 g FDE clean
66 g Hexane
1 g Acrylic silane methyacryloxypropyl-trimethoxysilane
14 g Hexane
1 mL $H_2O$ Upon blending the above mixture, it was observed that initially there were continuous plumes of hexane vapor and smell of a gas.

iv) Formulation D Combined in a Container:
2.8 g FDE (cleaned)
18 g Hexane
0.6 g AHAPTMS (aminohexylaminopropyltrimethoxysilane)
0.5 g $H_2O$ Stir the mixture by hand using a stirring instrument and decant the particles. Recovered 4.8 g wet particles.

v) Formulation E Combined in a Container:
3.0 g FDE
19 g Hexane
0.6 g MAPTMS (methacryloxypropyltrimethoxysilane)

Stir the mixture by hand using a stirring instrument and decant the particles. Recovered 3.8 g wet particles. When dried, 2.7 g grams of particles were recovered.

C) Reaction Sequence for adding Blooming Moiety to the Multifunctional Particle: In some embodiments, the order that the blooming moiety is coupled to the $SiO_2$-containing compound alters the functional characteristics of the resulting multifunctional compound. In some embodiments, the blooming silane moiety may be added to the $SiO_2$-containing compound first in a water-borne or alcohol system, and then the hydrophobic silane moiety added in a non-polar system. An exemplary reaction sequence is as follows:

1. Bake particles out to remove moisture, 225° F. for several hours.
2. Immerse particles in ethanol sufficient enough to fully wet and easily blend the particles.
3. Add quantity of blooming silane moiety.
4. Blend for several minutes.
5. Add quantity of hydrophobic silane moiety, blend for several minutes.
6. Dry particles.

Treating Multifunctional Particles with Ninhydrin:

To validate the chemical reactivity of the multifunctional particles, the particles were treated with an aminoalkylsilane, which is generally used as a reactive silane moiety. These nanoparticles were treated with ninhydrin, a chemical indicator which shows the presence of amino ($—NH_2$)

groups by turning the surface blue or purple. Treating silica particles functionalized with only the hydrophobic silane moieties resulted in yellow color, which is the same color as the ninhydrin, indicating that amino groups were not present. Fluorocarbon-functionalized diatomaceous earth was rinsed in hexane and functionalized with the aminoalkylsilane, and then these particles were rinsed to remove non-bound amino groups. Immersion of the nanoparticles in a 0.5 wt % ninhydrin in isopropanol solution resulted in the solution turning deep purple. The purple color has remained through many rinse/centrifuge/decant cycles with both hexane and isopropanol as the rinsing agent and through ultrasonication of particles to try and remove weakly bonded purple pigment groups from the particle surface. The nanoparticles were dried and found to be still superhydrophobic with the purple color change permanent, indicating that the nanoparticles can also have their color changed through chemical treatment.

A) Procedure for Ninhydrin Treatment: In a 2.0 mL microcentrifuge tube, put approximately 0.2 g of multifunctional particle powder into the tube (fill up to the 0.5 mL line). Fill the rest of the tube with ninhydrin solution. Close lid and shake tube to blend particles into the ninhydrin solution. Amine functional particles will show color change in the span of several seconds through minutes to hours, depending on the concentration of amine silanes on the particles. In some embodiments, a small 1 mL vial is filled with about 0.25 mL of unpacked fluoroamine fumed silica particle powder and about 0.5-1.0 mL of Ninhydrin solution (Carolina Biology Supply, 0.5% Ninhydrin solution in isopropanol). The powder should turn purple within 30 minutes. Use preheated powder for faster reaction.

B) Ninhydrin Treatment and Multifunctional Particle Preparation

Combine in a container:
50 g FDE (cleaned)
90 g Hexane
8.2 g AHS (aminohexylaminopropyltrimethoxysilane)
3 mL $H_2O$ Distilled Plus additional 100 mL Hexane to get particles distributed into liquid. Blend the FDE particles in the mixture for several minutes, and then filter the mixture with coffee filters. Heat the filtered mixture at 230° F. to speed up hexane removal. Rinse the filtered multifunctional particles according to the rinse cycle procedure below two times prior to ninhydrin testing to help eliminate unbounded amino silanes from the particles. After 24 hours, the multifunctional particles turned blue.

Rinse Cycle Procedure:

Place a small aliquot of particles in 2.0 mL microcentrifuge tube. Fill the tube with fresh hexane. Shake the tube to form a uniform solution. Centrifuge the solution at 3300 RPM for 60 seconds. Decant the solution and then refill the tube with fresh hexane and repeat. After another decant, fill the tube with the ninhydrin solution. Particles changed color after reacting with ninhydrin.

After five days, the multifunctional particle powder was again treated with ninhydrin, but the powder turned a light purple and did not turn as purple as the previously tested multifunctional particle powder despite being previously rinsed. To establish that the difference in the shades of purple was not linked to hexane presence, the multifunctional particle powder was tested against a control. The control included unfunctionalized diatomaceous earth powder that was rinsed 2 times with purified hexane and tested with ninhydrin. No difference was seen between a hexane-rinsed diatomaceous earth and the control diatomaceous earth. It was concluded that ($-NH_2$) groups decay over time or react with air.

Preparation of Compositions that Include Silica Particles and Polypropylene i) Control
Combine and blend:
4.1 g PP (polypropylene)
29 g Xylol ii) Single Functional Particle Composition
Combine and blend:
5.0 g PP
1.2 g Phenyl-functionalized DE
39 g Xylol Heat the control and the composition mixtures to 140° C., blend the heated mixture, and then pour the heated mixture into a mold. The polymer substrate was removed from the mold and found to lack superhydrophobicity.

iii) Methacrylate Silane Formulation:
15 g diatomaceous earth at room temperature
133 g Hexane
1.5 g Methacrylate silane
Plus <1 g $H_2$ iv) Octadecyltrichlorosilane Silane Formulation: Rolled 3.0 g of PP in 1.0 g DE functionalized with octadecyltrichlorosilane (ODCx). PP granules were covered with a thick layer of ODCx. The coated granules were heated to 150° C. There was too much ODCx for the entire granule collection to melt together, but some of the granule collection conglomerated. This conglomeration was observed to be superhydrophobic and durable with moderate finger rubbing.

v) Preparation of a silica particle/polymer construction To prepare the construction, the interior surface of a mold is pre-dusted with a layer of appropriate particles and other catalysts/additives and the polymer melt is injected so that the powder becomes stabilized on the surface of the resulting polymer part. For example, a layer of functionalized diatomaceous earth is placed onto a diamond-like carbon (DLC) coated aluminum. Heat polymer (e.g., PP) and place the polymer into a mold, then cover with another layer of functionalized diatomaceous earth. Use another diamond-coated aluminum to press the coated PP mold into a sandwich construction.

Variation 1 (Paste method): Blend the functionalized diatomaceous earth into a solvent, making a paste, and then blend the paste into a hot polymer. In one experiment, 0.3 g methacrylic functionalized diatomaceous earth was blended with 0.7 g mineral spirits to make a paste, and then the paste was blended with approximately 12 g of heated PP.

Variation 2 (Blend method): Blend a multifunctional diatomaceous earth powder into a hot polymer melt. In these experiments, the polymer was placed into a mold and melted at 400° F., and then removed from heat. Multifunctional diatomaceous earth was placed onto the surface of the polymer melt and manually blended into the PP at roughly 3-10 wt %. An excess amount of particles was used, and unbounded particles were recovered for future use. The polymer blend was then placed back into the oven to heat at 400° F. for another 15-20 minutes.

Variation 3 (Press method): Press a multifunctional diatomaceous earth into the surface of a hot polymer melt. In these experiments, the polymer was placed into a mold and melted at 400° F., and then removed from heat. The surface press method is similar to the blend method, except the particles were brushed onto the surface at less than 1 wt % and lightly pressed for several seconds. An excess amount of particles was used, and unbounded particles were recovered for future use. The polymer blend was then placed back into the oven to heat at 400° F. for another 15-20 minutes.

vi) Test Observations for the Silica Particle/Polymer Construction a) Fluorinated Silica Particles (single functionality): The construction was found to not be superhydrophobic because the particles became concealed by the polymer during cure in the press and blend methods described hereinabove. Some amount of superhydrophobicity was observed with the press method, but these particles were not bound and simply washed away with water or were blown off with air.

b) Non-functionalized Silica Particles: The construction was observed to be not superhydrophobic as particles became embedded into the material.

c) Amine-functionalized Silica Particles: The particles in this construction were successful in maintaining surface coverage in the blend and press methods. These samples appeared to have the most durability to finger rubbing.

d) Vinyl-functionalized Silica Particles: The particles in this construction were successful in maintaining surface coverage in the blend and press methods. These samples appeared to have good durability to finger rubbing.

e) Azide-functionalized Silica Particles: The particles in this construction had some success, although samples had some areas of hydrophilicity that could have been due to manufacturing technique.

f) Methacryloxy-, Octadecyl-, and Phenyl-functionalized Silica Particles: These polymer blends were not superhydrophobic.

Although the constructions and compositions were prepared using PP, it will be understood that any number of polymers can be used. It will be further understood, that the polymer construction can also be prepared by processing the multifunctional silica particles as a polymer blend additive such as in co-extrusion.

g) Blooming moiety-containing particle: In some embodiments, weight loading for a fumed silica product, such as Aerosil 300, is around 17%. For example, to generate a blooming moiety-containing particle, the following amounts may be used:

10 g Aerosil 300
0.38 g Amino-hexyl-aminopropyltriethoxysilane
1.30 g tridecafluoro-1,1,2,2,-tetrahydrooctyl trimethoxysilane These amounts lead to a theoretical surface coverage of about 16.8%. This same weight loading has been used for preliminary blooming experiments in LLDPE polyethylene with maleic anhydride and erucamide.

An 8% weight loading (resulting in 8% surface area) results in a wet polymer coating that was not superhydrophobic. However, using diatomaceous earth (30 $m^2$/g versus 300 $m^2$/g for Aerosil 300) superhydrophobic coatings can be obtained with as little as 4 wt % loading, but this would result in about 40% surface area coverage. In an embodiment, the lower limit of surface area coverage is about 10% and the maximum is about 100%. In this matter, one can use the same loading of particle (17 wt %) but a different particle (Aerosil 150, with 150 $m^2$/g) that would result in a 34% surface area coverage. This particle may be used to generate superhydrophobic coatings using low weight loading for particles, where 8 wt % would result in roughly 16% surface coverage.

Preparation of Compositions that Include Silica Particles and Epoxies

Diatomaceous earth particles have a surface area of about 30 $m^2$/g. The silanes used both have a coverage rating of about 300 $m^2$/g. Thus, the theoretical particle surface area is 150 $m^2$ and the silanes occupy 90 $m^2$, for a total surface coverage of 60%. This is well in excess of what has been shown to produce superhydrophobic diatomaceous earth, which is about 17% theoretical area when using chlorosilanes. By adding X amount of aminosilane first, the aminosilanes will cover a certain percent of the particle first, and then the 0.5 g of fluorosilane will completely saturate the rest of the particle, then be rinsed out of the particles in post-production. For example, putting 0.1 grams of silane on 5.0 g diatomaceous earth would theoretically cover 20% of the particles, leaving 80% of the surface for the fluorosilane. See Table 2 below for further details.

TABLE 2

| Amount of Aminosilane X (g) | Amine surface coverage | Fluorine surface coverage |
| --- | --- | --- |
| 0 | 0 | 100% |
| 0.1 | 20% | 80% |
| 0.2 | 40% | 60% |
| 0.3 | 60% | 40% |
| 0.4 | 80% | 20% |
| 0.5 | 100% | 0 |

Diatomaceous earth particles were functionalized according to the formulation provided below, having both fluorinated and alkylamine silanes.

5.0 g diatomaceous earth
0.2 g FAOS (1H,1H,2H,2H-perfluorooctyltrimethoxysilane) (hydrophobic silane)
0.1 g AHAPS (6-aminohexyl-3-aminopropyltrimethoxysilane) (coupling agent)
7 g Hexane
0.04 g Water The resulting multifunctional particles constituted the FADE (fluorocarbon/amino multifunctional diatomaceous earth) particles. An additional lot of diatomaceous earth was functionalized with just fluorinated silanes. This constituted the FDE particles (a control group). These particles were used to create two powder coatings on aluminum coupons as follows:

i) Base coat: Epoxy Powder
ii) Top coat: 80 wt % Epoxy Powder, 20% diatomaceous earth powder One coating incorporated FADE particles, the other used FDE particles. These powder coatings were deposited and cured according to manufacturer instructions. First, the aluminum coupon was coated with the epoxy powder until the surface was saturated. The coupon was then coated with the epoxy/diatomaceous earth powder blend until the surface was saturated. The coupons were cured at 400° F. for 10 minutes.

After cooling, both coatings were mechanically dusted by hand and blown with 30 psi of compressed air. The epoxy coating formulated with FADE particles was superhydrophobic and the particles were not removed by the compressed air. The top layer of the FDE coupon, on the other hand, did not adhere to the coupon surface and was blown off, resulting in a non-superhydrophobic coating. Afterwards, the coupons were analyzed with SEM as shown in FIGS. 3 and 4. FIG. 3 illustrates an image of the epoxy coating with the FADE particles and FIG. 4 illustrates an image of the epoxy coating with the FDE particles.

The presence of amino silanes on the FADE allowed coupling of the diatomaceous earth to the epoxy chemicals, allowing coupling of the particles to the surface as well as allowing epoxy polymers to form to the particle as opposed to concealing the particle. These FADE-Epoxy coatings are superhydrophobic and show increased levels of mechanical durability over other non-multifunctionalized coatings as determined by abrasion resistance to an ungloved finger. This FADE-Epoxy coating showed to be resistant to high water pressure, which was unable to penetrate the coating and wet at all. Other coatings were found to be susceptible to the same high water pressure, creating areas where the superhydrophobic coating was wetted.

In the above FADE formulation, it is thought that the overall particle behavior is dependent on the ratio of hydrophobic silane moiety to (hydrophilic) reactive silane moiety. That is, the particle has a majority of hydrophobic surface area in order to produce a superhydrophobic nanoparticle. The mass of hexane is based on larger scale production levels of hexane to diatomaceous earth ratios and was not found to be practical for this small scale testing.

Particles were coated as above, but the FADE were produced with varying amounts of amino silane. These particles have a surface area of about 30 $m^2/g$, and the silanes used in this study have a surface coverage rating of about 300 $m^2/g$. Thus, 1.0 g of diatomaceous earth could be 100% covered by 0.1 g of total silane. However, the true amount of surface coverage is limited by steric hindrance and reaction time.

In order to facilitate the coupling of aminosilanes to the particle, the aminosilanes and water were blended into the solution first for several minutes before addition of the fluorosilanes. Afterwards, 0.5 g of fluorosilane was blended into the solution in order to maximize hydrophobic character of the rest of the particle. The amount of hexane added was largely irrelevant as long as it dissolved the particles. All samples had a small amount of water added to the solution (<0.1 g) to catalyze the reaction (see Table 3 below).

Water contact angles were measured and are listed in Table 4 below. Due to the angle of the samples, contact angles were measured and an average was used to characterize the surface.

TABLE 4

| Sample | WCA Left | WCA Right | Average WCA |
|---|---|---|---|
| Ctrl 00 | 142.177 | 118.072 | 130.1245 |
| AM01 | 155.014 | 157.166 | 156.09 |
| AM02 | 152.583 | 152.033 | 152.308 |
| AM04 | 151.849 | 151.821 | 151.835 |
| AM05 | 150.980 | 150.803 | 150.892 |
| AM10 | 117.848 | 116.259 | 117.0535 |

FIGS. 6-11 illustrate images of a water drop contact angle for characterizing the hydrophobicity of the epoxy coated surfaces. FIG. 6 corresponds to the Ctrl 00 sample, FIG. 7 corresponds to the AM01 sample, FIG. 8 corresponds to the AM02 sample, FIG. 9 corresponds to the AM04 sample, FIG. 10 corresponds to the AM05 sample, and FIG. 11 corresponds to the AM10 sample.

The mechanism of this transition between matte superhydrophobicity and glossy hydrophobicity is linked to the fact that particles with increased amine content are able to have a higher concentration of covalent bonds to the polymer. The fluorinated particles will naturally not link to the epoxy functional groups, resulting in a substrate that has porous surface defects that interfere with optical reflectance. Adding aminosilane allows the epoxy to bond directly to the particle, and increasing the silane content results in more coupling sites resulting in a uniform coating with increased reflectance properties—and higher glossiness. Higher covalent bonding content results in increased mechanical durability, as the particles have more chemical links to the polymer overall.

In some embodiments, the reactive silane moiety used for coupling matches the targeted polymer to produce a coating with increased durability. For example, FADE AM04 par-

TABLE 3

| Control | AM01 | AM02 | AM04 | AM05 | AM10 |
|---|---|---|---|---|---|
| 5.0 g DE | 5.0 g DE | 5.0 g DE | 5.0 g DE | 5.0 g DE | 5.0 g DE |
| 0.0 g APS | 0.1 g APS | 0.2 g APS | 0.4 g APS | 0.5 g APS | 1.0 g APS |
| 0.5 g FAOS | 0.5 g FAOS | 0.5 g FAOS | 0.5 g FAOS | 0.5 g FAOS | 0.5 g FAOS |
| 10 g Hex. | 17 g Hex. | 24 g Hex. | 17 g Hex. | 20 g Hex. | 29 g Hex. |

The particles were isolated and dried, then blended into epoxy powder at an 80 weight % epoxy powder to 20 weight % FADE ratio. Coatings were made similar as discussed hereinabove with a pure bottom coat and an 80/20 top coat sprayed onto drywall samples.

The control sample, with diatomaceous earth functionalized solely with the FAOS and without the aminosilane, was not superhydrophobic and had no gloss. Visually, the samples with amine had increasing reflectance and sheen with increasing amine content, similar to a control epoxy powder coat that had no diatomaceous earth. The contact angle of superhydrophobic samples appeared to decrease with additional amine groups to the particle. The samples also had increasing particle retention and durability with increasing amine content. The AM10 sample had high gloss, but was not superhydrophobic, indicating amine levels had overwhelmed the superhydrophobic properties of the particles.

ticles (1.0 g) were blended into a PVC cement (2.0 g) and MEK (10 g) solution, a typical superhydrophobic coating formulation that has low durability. The resulting coating using the FADE was superhydrophobic but had very low durability, as particles would easily be brushed off of the surface.

To identify if the amine sites were reacted, ninhydrin indicator solution was applied to this PVC coating as well as to the previous AM04 sample. Ninhydrin will turn purple in the presence of —NH and —$NH_2$ groups. The ninhydrin solution was absorbed by both coatings. As shown in FIG. 5, the ninhydrin did not produce a purple reaction with the amino particles in the epoxy coating in the ninhydrin treated area 510 of the AM04 coated sample 502, likely due to these particles having fully reacted with the epoxy resin. The black streaks shown in FIG. 5 at the ninhydrin treated area 510 resulted from isopropyl alcohol in the ninhydrin solution streaking the black Sharpie marker used to designated the area 510. The ninhydrin did produce a purple reaction with the functionalized diatomaceous earth (AM04) in the PVC cement coated drywall sample 520 as evidenced by the purples spots 530 (see FIG. 5). In this case, the PVC cement apparently did not react to these particular aminosilanes, resulting in a coating that has diatomaceous earth particles that are only bound mechanically in a low durability coating. It is also evident that the chemical reaction did not influence the superhydrophobicity of the coating.

The above test results further show that altering the amount of amine silane on the silica particle will influence the characteristics of the resulting coating. Increasing amine content will increase durability, glossiness, and particle retention while remaining superhydrophobic. Overloading the particle with aminosilane results in a coating that resembles the base epoxy coating in that it is very glossy but not superhydrophobic.

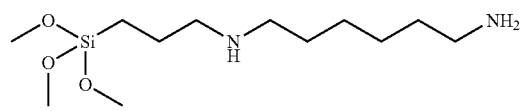 [SMILES: CO[Si](CCCNCCCCCCN)(OC)OC]

and tridecafluoro-1,1,2,2-tetrahydrooctyl)-triethoxysilane as a hydrophobic silane moiety:

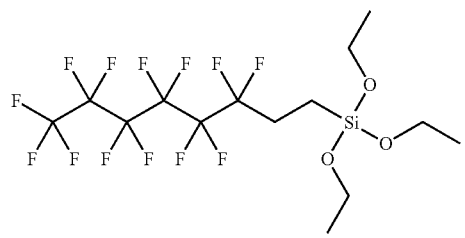 [SMILES: CCO[Si](CCC(F)(F)C(F)(F)C(F)(F)C(F)(F)C(F)(F)C(F)(F)F)(OCC)OCC]

TABLE 5

| Composition | LLDPE wt %, g | | Maleic anhydride wt %, g | | Particle wt %, g | | Slip agent wt %, g | | WCA |
|---|---|---|---|---|---|---|---|---|---|
| LLDPE control | 100% | 25 | 0 | 0 | 0 | 0 | 0 | 0 | 90 |
| LLDPE-maleic anhydride control | 95% | 25 | 5% | 1.25 | 0 | 0 | 0 | 0 | 90 |
| Amine functional diatomaceous earth | 91% | 25 | 5% | 1.25 | 5% | 1.25 | 0 | 0 | 130 |
| Fluorinated diatomaceous earth | 91% | 25 | 5% | 1.25 | 5% | 1.25 | 0 | 0 | 90 |
| Fluoroamine diatomaceous earth | 91% | 25 | 5% | 1.25 | 5% | 1.25 | 0 | 0 | 140 |
| Fluoroamine fumed silica | 91% | 25 | 5% | 1.25 | 5% | 1.25 | 0 | 0 | 155 |
| Fluoroamine diatomaceous earth and slip agent | 88% | 25 | 4% | 1.25 | 4% | 1.25 | 4% | 1 | 155 |
| High maleic anhydride, low fluoroamine diatomaceous earth | 88% | 25 | 9% | 2.5 | 3% | 0.75 | 0 | 0 | 140 |
| High maleic anhydride, high fluoroamine diatomaceous earth | 83% | 25 | 8% | 2.5 | 8% | 2.5 | 0 | 0 | 140 |
| Fluoroamine fumed silica and low slip agent | 88% | 25 | 4% | 1.25 | 4% | 1.25 | 4% | 1 | 155 |
| Fluoroamine fumed silica and high slip agent | 85% | 25 | 4% | 1.25 | 4% | 1.25 | 7% | 2 | 90 |

Two Roll Mill Trial

In some embodiments, the multifunctional particles are mixed with a polymer as part of a two roll mill trial. The two roll mill trial provides for increased additive and particle dispersion in the polymer and replicates real-world applications. In some embodiments, the effect of slip agents and/or blooming paths were also investigated.

In the two roll mill trial, various combinations of linear low density polyethylene (LLDPE), maleic anhydride, particles according to the present disclosure, and slip agents were combined and the resulting water contact angle measured. Table 5 presents the results of the two roll mill trial. The water contact angle was determined by melting cut samples of the resulting polymer on 400° F. heated 304 stainless steel to various stages and then water quenched.

In some embodiments, fumed silica is dual functionalized with N-(6-aminohexyl)-3-aminopropyltrimethoxysilane as a reactive silane moiety:

In some embodiments, maleic anhydride is used as a coupling agent in the polymer to increase coupling sites for the reactive silane moieties of the particles. For example, the maleic acid Epolene C-26 was included in the polymer in the two roll mill trial. Any suitable coupling agent may be used.

In some embodiments, a slip agent is also included in the composition to assist with processing of the polymer in the system. For example, a composition comprising 80% polypropylene (Americhem), 10% erucamide, and 10% oleamide was used in various sample of the two roll mill trial to determine the effect of the slip agent on hydrophobicity. In some embodiments, the slip agent reduces sheer and slows down cross-linking the resulting polymer.

As shown in Table 5, both the control comprising LLDPE and the control comprising LLDPE and maleic anhydride did not exhibit superhydrophobic characteristics (WCA=90 for both).

Diatomaceous earth (Celtix) coupled to single functional moieties also did not exhibit superhydrophobic characteristics. Specifically, the amine-functional diatomaceous earth having the reactive silane moiety had a water contact angle of 130. The fluorinated diatomaceous earth having the hydrophobic silane moiety had a water contact angle of 90.

Dual functional diatomaceous earth having both a reactive silane moiety and a hydrophobic silane moiety (fluoroamine diatomaceous earth) generated a hydrophobic surface when coupled to a polymer. The resulting polymer had a water contact angle of 140. Dual functional fumed silica having both a reactive silane moiety and a hydrophobic silane moiety (fluoroamine fumed silica) generated a superhydrophobic when coupled to a polymer. The resulting polymer had a water contact angle of 155.

The addition of the slip agent did not affect the superhydrophobic nature of the polymer surface generated with the fluoroamine fumed silica.

The presence of higher concentrations of maleic anhydride in the polymer resulted in hydrophobic surfaces on the polymer in both high and low concentrations of fluoroamine diatomaceous earth. Both resulting polymers had a water contact angle of 140.

The presence of low concentrations of the slip agent in the fluoroamine fumed silica polymer did not affect the water contact angle, which remained at 155. The presence of a higher concentration of the slip agent in the fluoroamine fumed silica polymer reduced the water contact angle to 90.

As seen from Table 5, dual-functional fumed silica resulted in a superhydrophobic polymer when mixed with and without low concentrations of the slip agent. Increasing the concentration of the slip agent in the polymer eventually reduced the hydrophobic nature of the resulting polymer. Dual-functional diatomaceous earth also produced a superhydrophobic polymer when combined with a low concentration of the slip agent.

Durability of Dual Functional Particles

To test the durability of dual functional partices, flouroamine fumed silica particles were used in conjunction with Bayhydrol 124 and acetone (coating name V124) to make an HVLP-sprayed superhydrophobic coating on a 4000 series flat steel substrate. This coating was compared to an off the shelf Rust Oleum 274232 Never Wet Multi Purpose Kit coating system, where the instructions were followed to produce a coating on the same 4000 series flat steel substrate. As is shown in the following results, the reactive silane moiety coupled to the polymer and enhanced durability of the resulting superhydrophobic surface compared to the Neverwet coating system.

As part of the comparison, both coatings were made at the same time and allowed to cure for 24 hours, per instructions. Both coatings were tested with a MIL severe abrasion eraser tester, MIL-E-12397B, with no cheese cloth (only the pumice eraser tip itself). The test was a modified version of MIL-PRF-13830B C.4.5.10 Severe abrasion, using a 1 lb abrasion pen. The coatings were abraded for five strokes over the same wear track, where going from point A to point B was one stroke.

The Neverwet sample fully wet after five strokes (failed) with the severe abrasion pen. The dual functional fumed silica sample was still superhydrophobic after one hundred strokes. This test showed that the sample using dual functional fumed silica particles was more mechanically durable than a commercially available superhydrophobic coating.

Imaging of Dual Functional Particles—EDX-SEM

Dual functional diatomaceous earth particles were examined by energy dispersive X-ray spectroscopy using scanning electron microscopy (EDX-SEM). The dual functional diatomaceous earth particles were found to have both fluorine and adhesive groups. For the test, diatomaceous earth particles were functionalized with 6-azidosulfonylhexyltriethoxysilane as the reactive silane moiety:

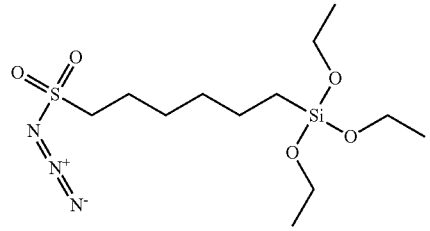 [SMILES: CCO[Si](CCCCCCS(=O)(=O)N=[N+]=[N-])(OCC)OCC]

and tridecafluoro-1,1,2,2-tetrahydrooctyl)-triethoxysilane as the hydrophobic silane moiety:

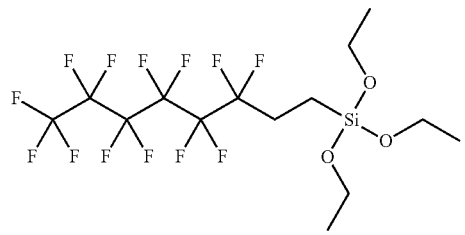 [SMILES: CCO[Si](CCC(F)(F)C(F)(F)C(F)(F)C(F)(F)C(F)(F)C(F)(F)F)(OCC)OCC]

The resulting EDX-SEM scan showed that both fluorine and sulfur groups were detectable, whereas fluorine-only and sulfur-only control powders did not show both of these results at the same time. In addition, the EDX-SEM for diatomaceous earth showed signatures for anticipated materials such as carbon, oxygen, silicon, trace metals magnesium, aluminum, calcium, iron, as well as elemental fluorine and sulfur.

An EDX-SEM scan of a particle with fluoro-amine dual functionality did not show the presence of the amine or nitrogen. This is likely due to the low weight and concentration of nitrogen. The presence of amine functionality was confirmed on these particles via ninhydrin tests. The scan also showed carbon, oxygen, fluorine, aluminum, silicon, and calcium.

Fracture Test Images

A fracture test was performed on the dual functional particles and demonstrated that the particles have chemical bonding to the polymer itself while maintaining superhydrophobicity (data not shown). The fracture test was performed by freezing a polymer and then fracturing it by snapping it in half. Chemical adhesion is seen where the polymer is attached to the particles that are exposed on the fracture interface. There is no visible gap between the particle and the polymer and the particle is fully embedded within the polymer based on a SEM image. In contrast, the same test performed on unbound particles shows that there is little to no interaction between the polymer and the additive. This is seen as a pocket that forms around the particle or the polymer forms strands to bridge around the particle rather than attach to it.

Similarly, blooming of dual functional superhydrophobic particles in polyolefins can be seen by looking at the surface of the polyolefin with SEM. In SEM images of polyolefins coupled to dual functional superhydrophobic particles, the blooming particles are near the surface of the olefin and portions of the particle emerge from the polymer surface. The SEM images display charging of the exposed silica material, which shows up as a bright white portion demonstrating the particle in a rough surface.

When particles having no blooming functionality (a portion of the silane that is hydrophilic/polar and incompatible with the hydrophobic/non-polar polyolefin), the particles are fully concealed by the polymer. This is seen as a generally smooth surface in the SEM. Breaking the surface of the polymer allows the particles to be exposed, but the particles will not emerge without post-processing abrasion or fracturing.

In some embodiments, blooming of dual functional particles through the surface of the polymer can be enhanced by:
i) Increasing the amount of polar material on the particle. This can be done by increasing the loading of hydrophilic/polar silane on the particle and by using a hydrophilic/polar linker on one of the silanes on the particle.
ii) Using slip agents such as oleamides and erucamides in concentrations between 1-6 wt %. In testing there was an increase in superhydrophobicity when using a slip agent at 4 wt % compared to no slip agent, but further increasing the slip agent to 7 wt % removed superhydrophobicity. SEM of these materials showed increased numbers of particles that breach the polymer-air interface.
iii) Heating the material, either in production or post-processing, can increase the diffusion potential of the particles within the polymer material.
iv) Using ethanolic baths to extract slip agents from polymer materials. These baths, either heated or unheated, can be used to promote blooming of particles within the polymer materials.
v) Using smaller particles that will diffuse through polymers easier. This is seen in SEM and results where dual functional diatomaceous earth particles have partial blooming and high water contact angle (140 degrees), but dual functional fumed silica particles used in the same weight % were superhydrophobic (over 150 degrees with no water adhesion). The dual functional fumed silica particles are smaller than the dual functional diatomaceous earth particles.
vi) Modifying the polymer-air interface with a sacrificial or alternative coating. Particles will more easily bloom from a polyolefin into a polar polymer such as an acrylic or silicone as opposed to blooming from a polyolefin into air due to the smaller interfacial tension of olefin:acrylate/silicone than olefin:air. This can be done, for example, in injection molding, where the metallic mold is coated with a silicone mold release agent first, or an acrylic coating is injected prior to the olefin, which is later dissolved.

Preparation of Compositions that Include Silica Particles and Acrylonitrile Butadiene Styrene:
Combine and blend:
25.7 g MEK
1.8 g ABS (acrylonitrile butadiene styrene) Black
1.9 g FADE Blend the above mixture with a magnetic stir bar. Hand dip a glass slide into the mixture and bake the coated glass slide for several minutes at 200° F. In the thin areas of the coating, the coating surface was not superhydrophobic, but the coating was superhydrophobic in thicker areas. Increase thickness by immersing the glass slide for about 20 seconds and then bake the coated glass slide for 2 minutes at 200° F. The coating was observed to be durable as only a small amount of powder could be rubbed off of the glass surface. The surface was also superhydrophobic after being rubbed with a gloved hand to visibly remove powder from the surface. A high pressure jet of water eventually applied to the coated glass surface eventually wetted the surface.

Modification of the Above Formula:
Add 2 g ABS to remaining 26 g of solution, and repeat the above process. A thick and opaque coating that was applied to the glass was found to be durable and superhydrophobic with no visible powder removed upon wiping. High pressure water wets surface and water rubbed on surface wets as well, however, drying the surface restores the durable and superhydrophobic properties. Glass sample holds up to rubbing with an ungloved finger and maintains near superhydrophobic roll off of 5-10 degrees.

Preparations of Asphalt Compositions that Include Silica Particles:

A series of experiments was performed to modify low viscosity asphalt paint using either an organic solvent-based asphalt or a water-based asphalt. FIG. 12 illustrates a SEM image of asphalt coating with non-functionalized diatomaceous earth. The circular objects, for example the circular object 1202, represent the particles of diatomaceous earth. As shown in the illustrated embodiment, the coating surface is very porous with many structure having high aspect ratios. FIG. 13 shows a SEM image of an epoxy-based polymer coating with multifunctional diatomaceous earth having a flat, non-porous, continuous surface, which has good abrasive durability. Circular objects 1310 of FIG. 13 are diatomaceous earth particles. FIG. 14 shows an SEM image of un-modified asphalt.

Method: Diatomaceous earth functionalized with various fluorinated silane moieties and/or reactive silane moieties (e.g., amine, methacryloxy, OTS) are dispersed in a toluene solution and blended into the asphalt paint. The resulting solution is sprayed with a compressed air system onto surfaces for evaluation. When diatomaceous earth is blended directly into asphalt paint, it acts as a thixotropic agent and the resulting spray coating is generally not superhydrophobic. The coating can become superhydrophobic when the solution is diluted with toluene after particles have been added, but this is inconsistent. Most consistent results are blending in a toluene-diatomaceous earth paste into the asphalt.
1. Dilute 2.5 g multifunctional diatomaceous earth particles in 5.0 g toluene
2. Blend the particles and toluene mixture into 2.5 g solvent-based asphalt in air condition.
   a. Add catalysts or additives while blending
   b. If necessary, heat solution within a distillation column
3. Spray the mixture onto the surface of a substrate in several thin coats. Avoid 'puddling' the solution or otherwise creating wet gels in the coating. Final coating thickness is about 2 mils after air drying.
4. Resulting coating is brown and superhydrophobic.
5. Different silanes, catalysts, and additives have shown to have influence on final coating properties, such as ability to wet over time, abrasive durability, and water pressure resistance.
6. Particle Functionalization: Particles were loaded at a 1:10 weight ratio of total silane to bulk powder silica particles in hexane with a small amount of water added to the solution. Silanes were generally assumed to have at least 300 $m^2/g$ of coverage, and the diatomaceous earth particles generally have 30 $m^2/g$ of surface area. Particles with two silanes were loaded at 60/40 or 70/30 weight percent ratios of hydrophobic silane moiety (fluorocarbon) to reactive silane moiety.

Test Results a) Methacryloxy-functional reactive silane moieties for multifunctional particles: these asphalt coatings had the best overall properties when used with no other additives. The coatings were superhydrophobic and had high durability and high water pressure resistance. Benzoyl peroxide was used as a catalyst to increase bonding of methacryloxy particles to produce more robust coating samples with the same magnitude of durability.

b) Octadecyl and phenyl functional silanes for multifunctional particles: resulted in coating with lower abrasive durability when compared to the asphalt coating with methacryloxy silanes. Octoadecyl based coating had high durability and water pressure resistance. Phenyl based coating had mediocre durability.

c) Amine-functional reactive silane moieties for multifunctional particles: adding ABS (acrylonitrile butadiene styrene) polymer to the asphalt and using amine reactive silane moieties to functionalize the diatomaceous earth generated better test results than methacryloxy asphalts. Amine based coatings had low to mediocre durability with no additives, but the coating had the highest durability of all additives once combined with ABS.

d) Puddling the asphalt spray results in a black or otherwise very dark coating that is smooth but not superhydrophobic.

e) Plain diatomaceous earth: asphalt becomes superhydrophobic, but has low durability, low water pressure resistance, and wets over time.

f) Fluorocarbon singly functional diatomaceous earth: The asphalt coating is superhydrophobic, but water droplets wet within seconds of sustained contact. Low durability and water pressure resistance. Further, fluorinated powder has decreased miscibility with hydrocarbon solvents. Particles can be more easily blended with toluene when treated with chemically active silanes as well as fluorosilanes. Still further, fluorocarbon is not necessary to produce a superhydrophobic coating.

g) Additives:

1) Acryl Butadiene Styrene—Increased durability of methacryloxy and amine asphalt blends. Made amine based coatings the most durable asphalt coating.

2) Benzoyl Peroxide—Used with methacryloxy particles.

Applications

The multifunctional particles can be used to create a mechanically robust superhydrophobic surface when combined with polymer binders. This is due to copolymerization of the adhesive chains with monomers, resulting in particles that are mechanically and chemically bound to a given surface and migrate to the surface. For example, the multifunctional particle may be used in preparing polymer injection molding and extrusion products. In one example, adding anti-microbial functionality to the multifunctional particle can result in a product, such as a spray paint, that has inherent anti-microbial properties which will kill microbes that come in contact with the spray paint even after it has dried. In another example, the superhydrophobic composition can be applied as a sealant on surfaces that are prone to water permeability and corrosion such as underground PVC pipes, wall board, underground building materials, pipe interiors, and power line protective sheaths. The composition can be applied to a biofouling-prone material such as underwater pier structures. The composition can be applied to enhance water flow on surfaces such as pipe interiors, boat hulls, surf boards, other general water and snow sports products, gutters, under-deck draining structures, marine and aviation bilge areas, and consumer product bottles.

The composition can be applied to concrete, asphalt roadways/racetracks, composite decking and wooden walking surfaces to prevent the absorption of water, prevent the formation of ice, and decrease the drying time on these surfaces. The composition could be applied to Radar radomes to prevent the absorption of water and prevent the formation of ice. The composition can be applied to wood and paper products as a barrier to prevent surfaces from wetting and developing biological growths such as mold and mildew. The composition could be used in a mixture with water or oil to allow for controlled compressibility of the mixture for use in shock absorbers, pressure sensors, and hydraulic systems. The composition can be applied to heat pump condenser coils to reduce energy consumption related to coil de-icing. The composition can be applied to circuit boards and other electronics to prevent electrical shorts due to wetting. The composition can be applied to fiberglass and other thermal insulating materials to prevent wetting and reduced functionality. The composition can be applied to medical and personal hygiene devices to reduce the likelihood of water transferred bacteria and germs.

The reactive silane moieties can be adjusted such that the multifunctional particles can couple to natural and synthetic textiles, which can be used for swim suits, solvent-resistant clothing, and chemical resistant military uniforms or other protective coating. Such textiles can be used as durable, robust, and scalable low-surface-energy textile treatments for militarily relevant, synthetic textiles that will prevent absorption and adhesion of fine aerosols and that will shed most bulk liquids.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A particle comprising:
   a surface;
   a first silane moiety coupled to the surface and having at least one hydrophobic appendage and an anti-microbial functional group; and
   a second silane moiety coupled to the surface and having at least one appendage comprising a reactive functional group and a hydrophilic repeating unit, wherein the second silane moiety is a reaction product of the particle with a member selected from an amino-functional hydrocarbon alkoxysilanes, N-(6-aminohexyl)-3-aminopropyltrimethoxysilane, aminohexylaminoethyltrimethoxysilane, aminopropyltrimethoxysilane, aminopropyltriethoxysilane, N-(2-Aminoethyl)-3-aminopropyl-trimethoxysilane, methyacryloxypropyltrimethoxysilane, or combinations thereof, whereby the particle is:
(i) superhydrophobic as a result of the hydrophobic appendage;
(ii) chemically reactive as a result of the reactive functional group;
(iii) anti-microbial as a result of the anti-microbial functional group; and
(iv) migratory to a surface of a hydrophobic matrix in which the particle is included as a result of the hydrophilic repeating unit.

2. The particle of claim 1, wherein the particle is a metal particle; a $SiO_2$-containing particle selected from the group consisting of diatomaceous earth, fumed silica, fused silica, and rice husk ash; or an inorganic particle exclusive of the group of $SiO_2$-containing particles.

3. The particle of claim 1, wherein the particle further comprises a third silane moiety coupled to the surface and having at least one appendage comprising an anti-microbial functional group.

4. The particle of claim 1, wherein the first silane moiety is a reaction product of the particle with 3-trimethoxy silyl propyl dimethyl octadecyl ammonium chloride.

5. The particle of claim 1, wherein the hydrophilic repeating unit is oxyethylene.

6. The particle of claim 1, wherein the second silane moiety comprises aminosilanes, olefin silanes, anhydride silanes, epoxy silanes, halogen silanes, hydroxyl silanes, dipodal silanes, acrylate silanes, sulfur-containing silanes, isocyanate silanes, or azide silanes.

7. The particle of claim 1, wherein the first silane moiety comprises a reaction product of the particle with a molecule of the structure:

; where:

y is 1 to 3;
X is —Cl, —Br, —I, —H, HO—, R'HN—, R'$_2$N—, imidizolo, R'C(O)N(H)—, R'C(O)N(R")—, $F_3$CC(O)N(H)—, $F_3$CC(O)N(CH$_3$)—, or $F_3$S(O)$_2$O—, where R' is a straight or branched chain hydrocarbon of 1 to 4 carbons and R" is methyl or ethyl;
L, a linking group, is a radical selected from: —CH$_2$CH$_2$—; —CH$_2$CH$_2$CH$_2$—; —CH$_2$CH$_2$O—; —CH$_2$CH$_2$CH$_2$O—; —CH$_2$CH$_2$C(O)—; —CH$_2$CH$_2$CH$_2$C(O)—; —CH$_2$CH$_2$OCH$_2$—; —CH$_2$CH$_2$CH$_2$OCH$_2$—; and R is —(CF$_2$)$_n$CF$_3$ or —(CF(CF$_3$)OCF$_2$)$_n$CF$_2$CF$_3$, where n is 0 to 24.

8. The particle of claim 1, wherein the first silane moiety comprises a reaction product of the particle with 1H,1H,2H,2H-perfluorooctyltrichlorosilane.

9. The particle of claim 1, wherein the second silane moiety comprises a reaction product of the particle with N-3-[(amino(polypropylenoxy)]aminopropyltrimethoxysilane.

10. A composition comprising:
a hydrophobic polymer; and
multifunctional particles dispersed or distributed in the hydrophobic polymer, at least a portion of the multifunctional particles comprising:
a first silane moiety coupled to a surface of a multifunctional particle, the first moiety comprising at least one hydrophobic appendage and an anti-microbial functional group; and
a second silane moiety coupled to the surface of the multifunctional particle, the second moiety comprising at least one appendage comprising a reactive functional group and a hydrophilic repeating unit, wherein the second silane moiety is a reaction product of the particle with a member selected from an amino-functional hydrocarbon alkoxysilanes, N-(6-aminohexyl)-3-aminopropyltrimethoxysilane, aminohexylaminoethyltrimethoxysilane, aminopropyltrimethoxysilane, aminopropyltriethoxysilane, N-(2-Aminoethyl)-3-aminopropyltrimethoxysilane, methyacryloxypropyltrimethoxysilane, or combinations thereof, whereby the multifunctional particle is
(i) superhydrophobic as a result of the hydrophobic appendage;
(ii) chemically reactive as a result of the reactive functional group;
(iii) anti-microbial as a result of the anti-microbial functional group; and
(iv) migratory to an air-exposed surface of the hydrophobic polymer as a result of the hydrophilic repeating unit.

11. The composition of claim 10, wherein the-hydrophobic polymer is selected from thermosets, acrylates, methacrylates, polyesters, urethanes, epoxies, phenolics, thermoplastics, polydienes, polyvinyl chloride, polyphenylene sulfide, acrylics, maleic anhydride, vinyl acetate, diene-containing copolymers, halogen-modified homopolymers, chlorosulfonyl-modified homopolymers, polyamides, polyesters, polycarbonates, polysulfones, olefins, and combinations thereof.

12. The composition of claim 10, wherein the-hydrophobic polymer is polymerized or the polymer comprises at least two precursor components copolymerized with the multifunctional particles.

13. An article comprising:
a hydrophobic polymer; and
multifunctional particles presented on an air-surface interface of an article, the multifunctional particles comprising:
at least one first silane moiety comprising at least one hydrophobic appendage and an anti-microbial functional group; and
at least one second silane moiety comprising at least one appendage having a reactive functional group and a hydrophilic repeating unit, wherein the second silane moiety is a reaction product of the particle with a member selected from an amino-functional hydrocarbon alkoxysilanes, N-(6-aminohexyl)-3-aminopropyltrimethoxysilane, aminohexylaminoethyltrimethoxysilane, aminopropyltrimethoxysilane, aminopropyltriethoxysilane, N-(2-Aminoethyl)-3-aminopropyltrimethoxysilane, methyacryloxypropyltrimethoxysilane, or combinations thereof.

* * * * *